(12) United States Patent
Marini et al.

(10) Patent No.: US 12,270,466 B1
(45) Date of Patent: Apr. 8, 2025

(54) FLUID DISTRIBUTION SYSTEM AND DEVICE

(71) Applicant: DANA ITALIA S.R.L., Arco (IT)

(72) Inventors: Michelangelo Marini, Trento (IT); Matteo Dallapiccola, Trento (IT); Pier Paolo Rinaldi, Medina, TN (US)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/620,770

(22) Filed: Mar. 28, 2024

(51) Int. Cl.
*F16H 57/04* (2010.01)

(52) U.S. Cl.
CPC ....... *F16H 57/043* (2013.01); *F16H 57/0426* (2013.01)

(58) Field of Classification Search
CPC ............................ F16H 57/0426; F16H 57/043
See application file for complete search history.

(56) References Cited

U.S. PATENT DOCUMENTS

| | | | |
|---|---|---|---|
| 4,741,220 A * | 5/1988 | Watanabe | F16H 57/0434 184/6.12 |
| 5,366,043 A * | 11/1994 | Kretschmer | F16N 21/00 464/7 |
| 6,511,379 B2 * | 1/2003 | Bondioli | F16D 3/382 464/7 |
| 8,025,081 B2 | 9/2011 | Poskie et al. | |
| 9,506,553 B2 | 11/2016 | McKinzie et al. | |
| 10,408,278 B2 * | 9/2019 | Matsuura | B60K 17/34 |
| 12,117,044 B2 * | 10/2024 | Bondioli | F16C 3/035 |
| 2013/0118302 A1 | 5/2013 | Poon et al. | |
| 2021/0388896 A1 * | 12/2021 | Lewis | F01D 25/18 |
| 2022/0144071 A1 * | 5/2022 | Hammond | F16H 57/02 |
| 2022/0154879 A1 | 5/2022 | Zendri et al. | |

* cited by examiner

*Primary Examiner* — Minh Truong
(74) *Attorney, Agent, or Firm* — McCoy Russell LLP

(57) ABSTRACT

A fluid distribution system is disclosed herein for mechanical systems, such as vehicle transmissions with forced lubrication. The fluid distribution system may comprise: a fluid distribution system, comprising: a fluid distribution device positioned in a hollow shaft comprising a coaxial passage and a plurality of radial channels, the fluid distribution device comprising: a cartridge coaxial with the hollow shaft, comprising a first circular side having a coaxial inlet opening and a second circular side having a plurality of tube openings positioned equidistantly from an axis of rotation of the hollow shaft; and a plurality of pipes, each pipe extending from one of the plurality of tube openings parallel to the axis of rotation of the hollow shaft, where a length of each pipe corresponds to axial positions of the plurality of radial channels axially spread apart along the hollow shaft.

17 Claims, 10 Drawing Sheets

FLUID DISTRIBUTION SYSTEM AND DEVICE

TECHNICAL FIELD

The present description relates generally to a fluid distribution device which may be positioned in a hollow shaft of a fluid distribution system for distributing fluid to components arranged about the shaft.

BACKGROUND AND SUMMARY

Mechanical power transmission systems as drivetrains, gearboxes or transmissions may demand lubrication for relative motion (e.g., sliding and/or rolling) of components, such as gears and bearings. A sufficient lubricant supply to one or more consumers (e.g. bearings, or gear mesh) may be demanded in a mechanical power transmission system to reduce friction. Methods that may be used to provide lubricant (e.g., oil) to the consumers include forced lubrication and splash lubrication. Splash lubrication may include random spread of lubricant (e.g., dragged or splashed) by moving elements, thus high power losses may occur due to fluid friction generated by more parts rotating in the lubricant and a greater amount of oil may be demanded than targeted lubricant delivery methods, such as forced lubrication. Thus, forced lubrication may be desired to reduce power losses and lubricant volume. Forced lubrication may include use of a pump, such as a volumetric pump with mechanical or electric drive, to induce fluid flow. A fluid distribution method may be implemented to appropriately deliver fluid (e.g., lubricant) to the consumers to lubricate and/or cool the system.

However, current fluid distribution systems may not adequately target the consumers. For example, a fluid distribution system may include a horizontally oriented shaft (e.g., relative to a direction of gravity) with a hollow center through which fluid may flow and channels which may allow fluid to flow from the hollow center to components exterior to the shaft, such as gears and/or bearings. The channels may be spaced from one another along an axial length of the shaft. Due to rotational speed of the shaft about an axis concentric with the axial centerline of the shaft, the channels closer to an inlet through which fluid enters the hollow center may receive more fluid than channels further from the inlet. Thus, an excessive amount of fluid may be pumped through the fluid distribution system in order to achieve adequate fluid flow through the furthest channel from the inlet. The excess fluid may build up in undesirable locations, for example in a transmission sump, such that drag losses are increased by components of the system interacting with the excess fluid buildup.

An alternative attempt to solve the abovementioned issues may include drilling blind feeding holes into the shaft to connect the inlet with each of the channels, wherein the feeding holes are parallel to but not coaxial with the axial centerline of the shaft. In this way, roughly the same amount of fluid may flow through each of the channels. However, machining the geometry of such a shaft may be expensive and complicated. Additionally, for a shaft of at least a length and/or having at least a number of consumers, material continuity in the shaft may not be adequate due in part to the number of feeding holes being dependent on the number of consumers.

Thus, embodiments are disclosed herein that may address at least some of the issues described above with a fluid distribution system, comprising: a fluid distribution device positioned in a hollow shaft comprising a coaxial passage and a plurality of radial channels, the fluid distribution device comprising: a cartridge coaxial with the hollow shaft, comprising a first circular side having a coaxial inlet opening and a second circular side having a plurality of tube openings positioned equidistantly from an axis of rotation of the hollow shaft; and a plurality of pipes, each pipe extending from one of the plurality of tube openings parallel to the axis of rotation of the hollow shaft, where a length of each pipe corresponds to axial positions of the plurality of radial channels axially spread apart along the hollow shaft. In this way, an appropriate amount of fluid may be delivered through each channel in the shaft, thereby reducing fluid volume demands and power losses. Thus, resource demand for a system wherein the fluid distribution of the present disclosure is incorporated may be decreased. Further, efficiency of the system may be increased. For example, drag losses due to excessive fluid interfering with movement (e.g., rotation, sliding, rolling and the like) may be reduced by reducing fluid volume demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
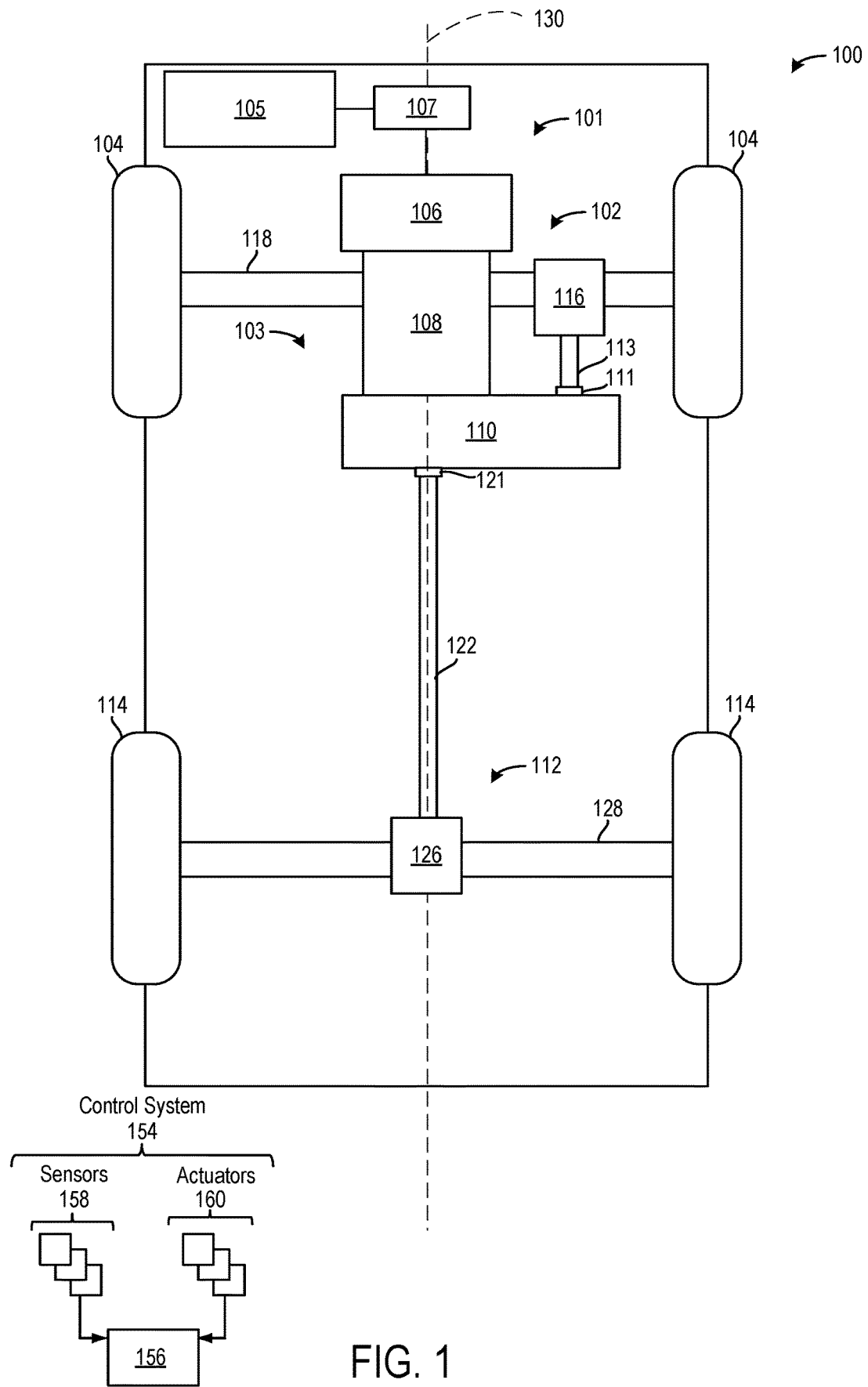
FIG. 1 shows an example schematic of a vehicle which may include a transmission having the fluid distribution system of the present disclosure.
Figure 2:
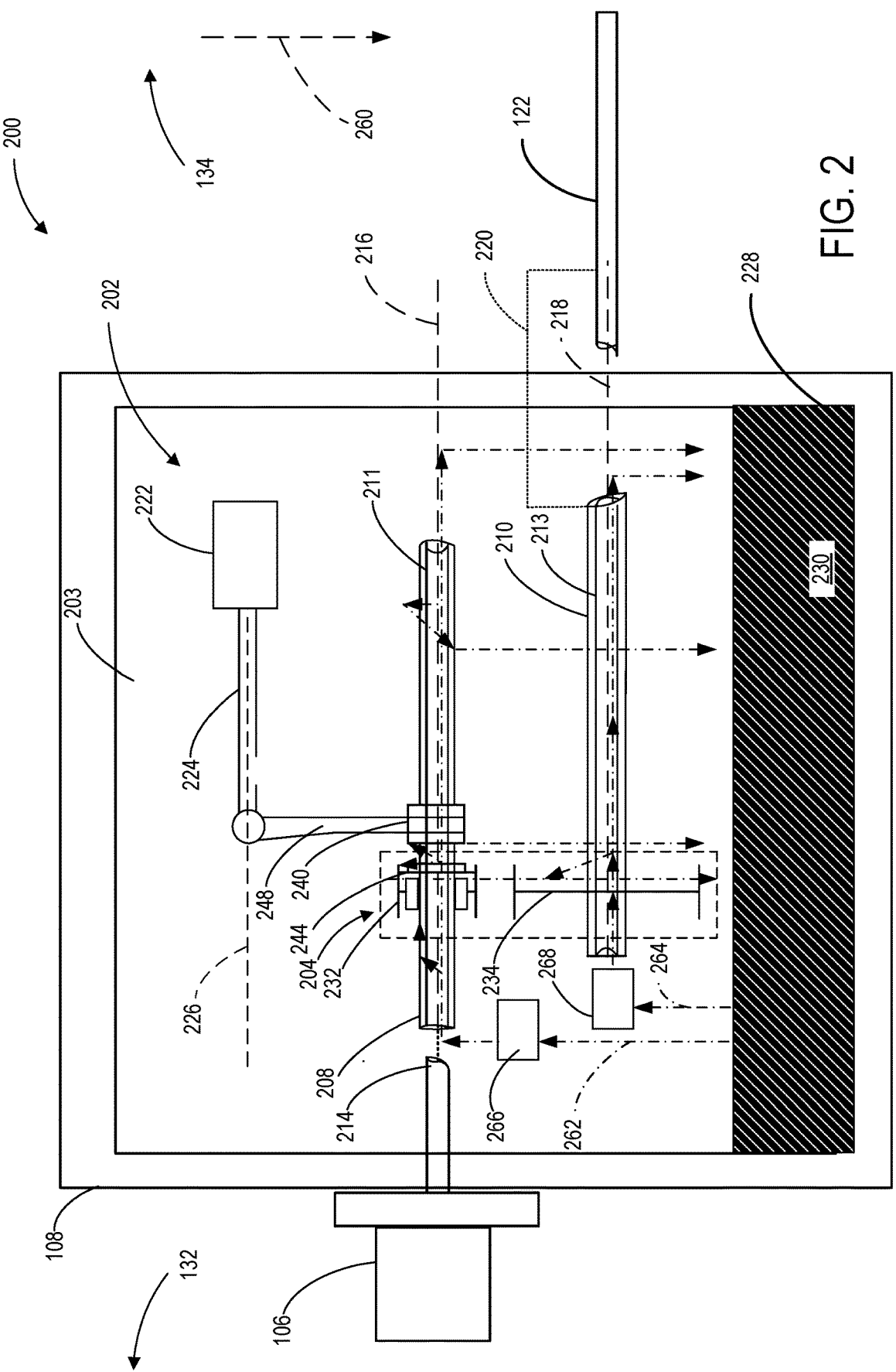
FIG. 2 shows an example schematic of a gear assembly of the transmission.
Figure 3:
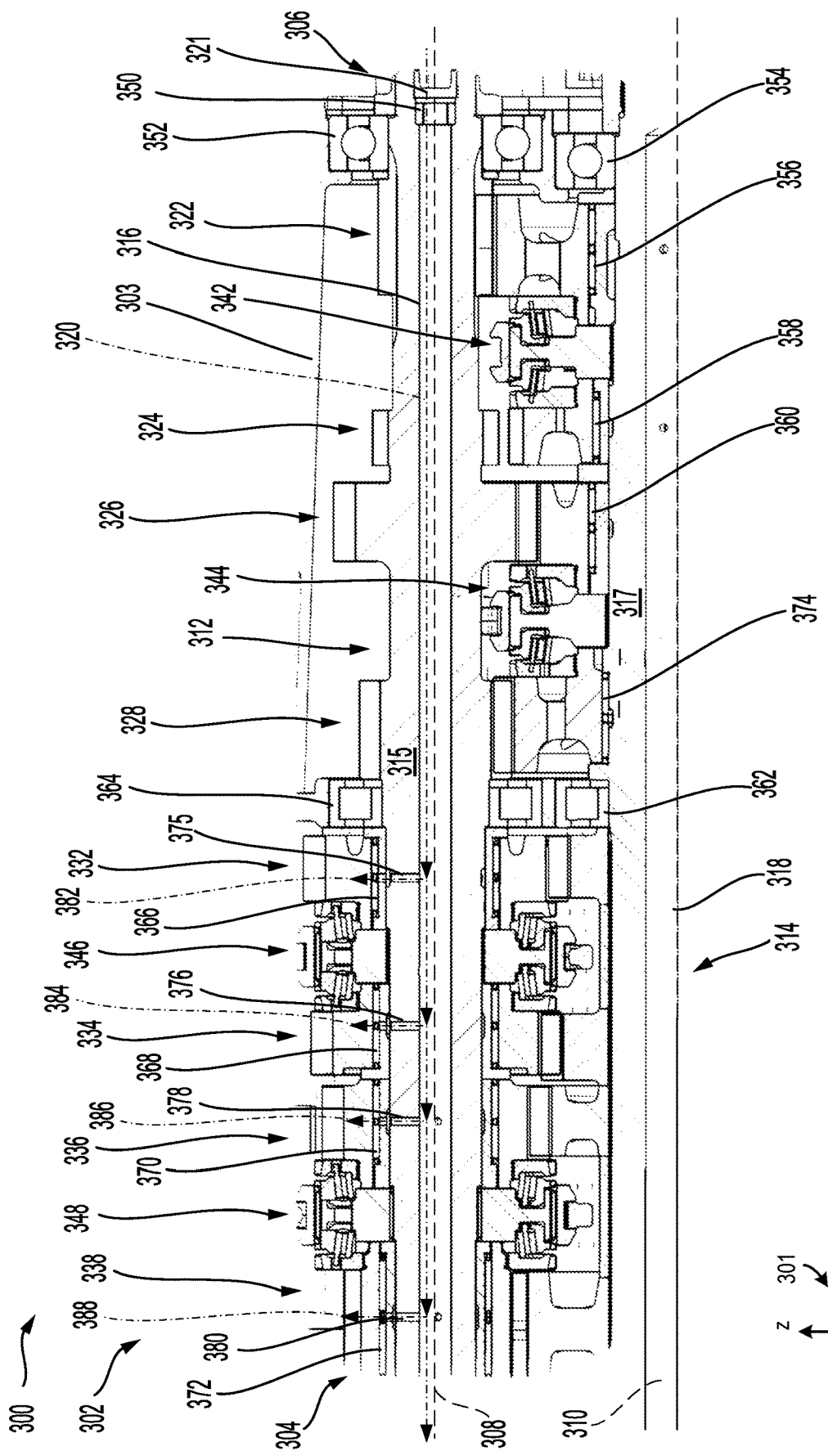
FIG. 3 shows a sectional view of an eight speed gearbox.
Figure 4:
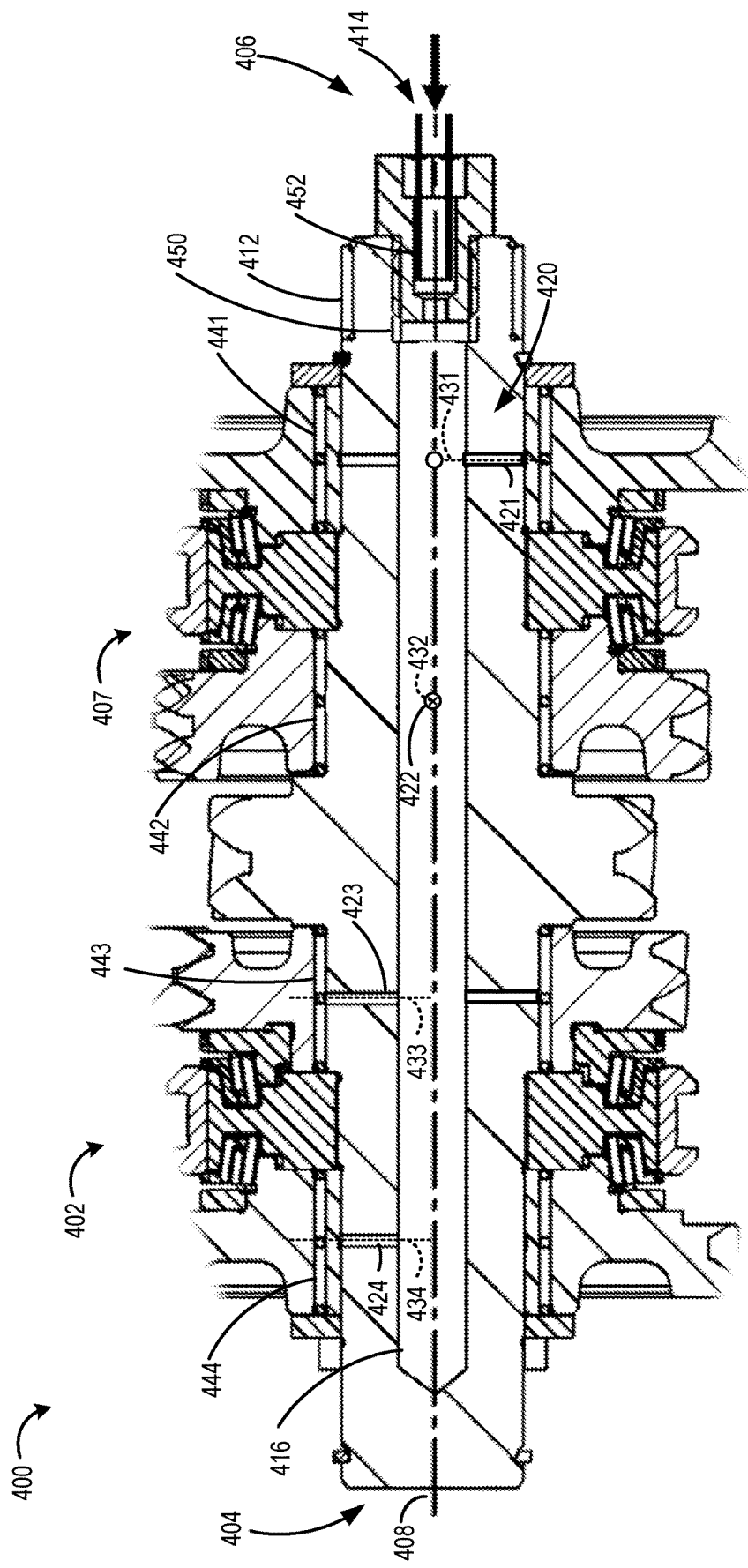
FIG. 4 shows a sectional view of a portion of a multispeed gearbox.
Figure 5:
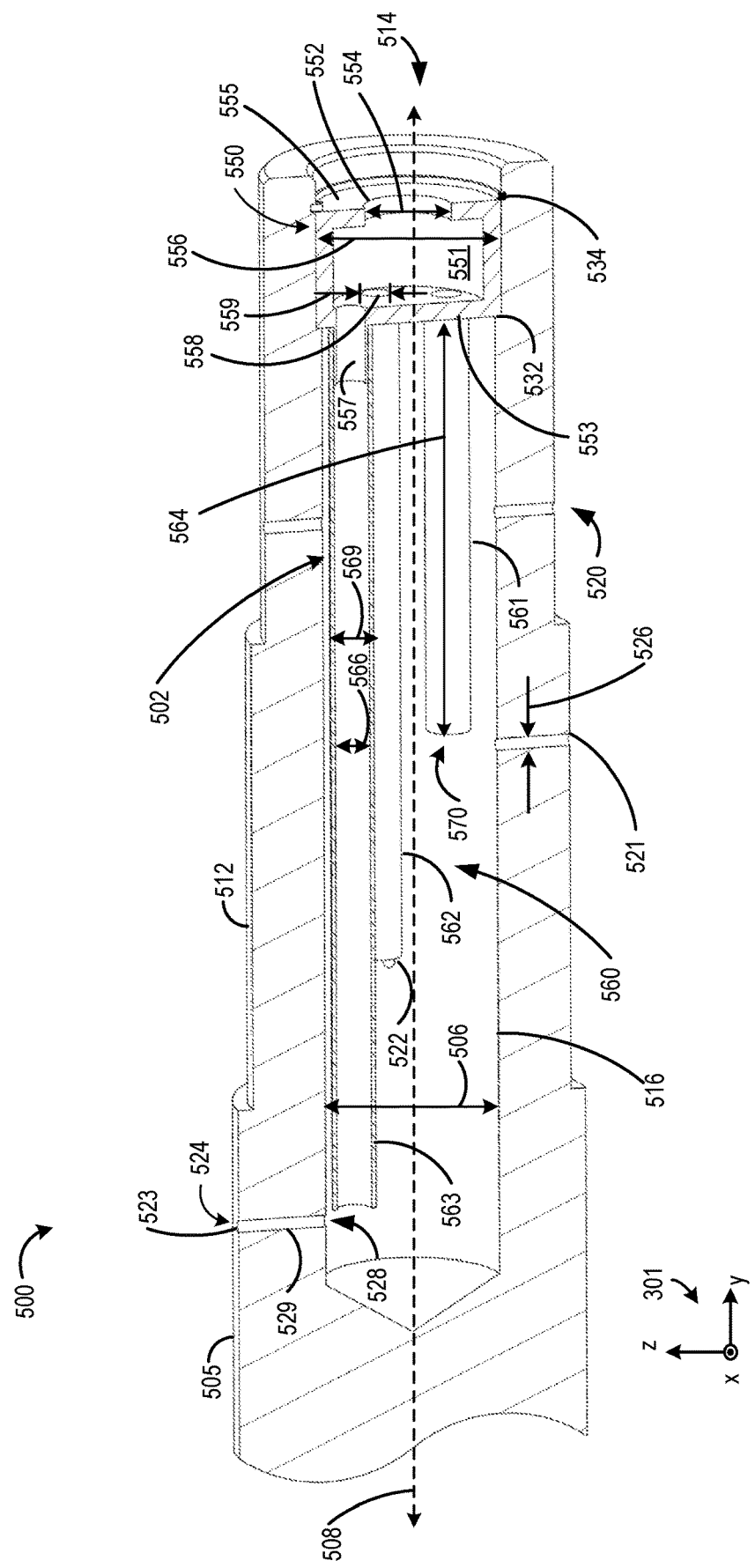
FIG. 5 shows a sectional view of a fluid distribution system, including a hollow shaft and a fluid distribution device.

The following description relates to systems and methods for fluid distribution systems, including an oil distributing device which may be inserted into a hollow shaft for delivery of fluid to specific components along the shaft. For example, the fluid distribution system may be used to deliver fluid to gears and/or bearings along a shaft in a transmission of a vehicle. FIG. 1 shows an example schematic of a vehicle which may include a transmission with the fluid distribution system of the present disclosure. The vehicle in FIG. 1 may be an electrified vehicle such as an EV or a hybrid vehicle with multiple sources of torque that may include an electric motor, a hydrogen fuel cell, and/or a non-internal combustion engine. FIG. 2 shows an example schematic of a gear assembly of the transmission which includes a forced lubrication system. FIGS. 3 and 4 show example gearboxes that may be included in the transmission, including shafts and rotating components arranged about the shafts. An example of the fluid distribution system of the present disclosure, including a hollow shaft, such as the shafts of FIGS. 3 and 4, and a fluid distribution device, is shown in FIG. 5. The fluid distribution device is further depicted in various views in FIGS. 6-8 and 10. The fluid distribution system may be adapted to collect fluid in an annular volume when rotated at least a threshold angular speed, as shown schematically in FIG. 9. The fluid distribution device may further be adapted to deliver approximately equal amounts of fluid to each of the components arranged about the hollow shaft. In this way, the fluid distribution device may allow for a desired fluid volume to reach each of the components with reduced fluid volume demand. Reduced fluid volume demand may reduce an amount of excess fluid causing drag losses on rotation of components. Thus, the fluid distribution system disclosed herein may reduce resource demand and increase efficiency in a mechanical system.

FIGS. 1 and 2 show schematics of an example configuration with relative positioning of the various components. FIGS. 3-10 show example configurations with approximate positioning. Further, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

As used herein, the terms "approximately" is construed to mean plus or minus five percent of the range unless otherwise specified. Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. Additionally, the transmission 108 may be a gearbox, an axle, or a trans axle. The transmission 108 may be a forced lubrication transmission part of a forced lubrication transmission system, where lubricant may be pumped at a pressure for lubrication, and may apply lubricant, such as via a spray, a mist, or a drop. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a light, medium, or heavy duty vehicle. The vehicle 100 may be an on-highway vehicle, a passenger vehicle, including a passenger car, a commercial vehicle that is an on-highway vehicle, a semi-trailer truck, and/or a sports utility vehicle. The vehicle may be an off-highway vehicle or a vehicle with on-highway and off-highway capabilities, such as a construction vehicle, an agricultural vehicle, a sports utility vehicle, and/or a commercial vehicle that is an off-highway vehicle. For an example embodiment, the vehicle 100 may be a wheeled vehicle, such as an automobile. Additionally or alternatively, the vehicle 100 and/or one or more of its components, such as components of the powertrain 101 and/or drivetrain 103, may be used in industrial, locomotive, military, agricultural, and/or aerospace applications. Additionally or alternatively, the vehicle 100 may be a plane, a boat, or other vehicle system that utilizes lubricant. In one example, the vehicle 100 is an all-electric vehicle or a vehicle with all-electric modes of operation, such as a plug-in hybrid vehicle. As such, the prime mover 106 may be an electric machine. In one example, the prime mover 106 may be an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. The drivetrain 103 is shown in a four-wheel drive configuration, although the drivetrain 103 may have other configurations without departing from the scope of this disclosure, and the configuration shown in FIG. 1 is provided for illustration, not limitation.

In some configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature. Upon receiving the signals from the various sensors 158, controller 156 processes the received signals, and employs various actuators 160 of vehicle 100 to adjust drivetrain operations based on the received signals and instructions stored on the memory of controller 156. The controller 156 may command operations, such as adjusting an angular speed of one or more shafts of the transmission 108, for example by adjusting the mover speed.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, where the vehicle 100 further comprises a second transmission arranged on the second set of axle shafts 128.

Turning to FIG. 2, a schematic 200 of the transmission 108 illustrated with reference to FIG. 1 is shown. The transmission 108 includes a volume that may be referred to as a gear enclosure 203. In an example of a configuration, the gear enclosure 203 may house a gear assembly 202. The gear enclosure 203 may house or house portions of a plurality of shafts that support rotational elements of the gear assembly 202. The transmission 108 may be a multi-stage reduction gearbox where the gear assembly 202 acts as a system of a plurality of reduction sets. Alternatively, the transmission 108 may be another form of multi-stage transmission, such as a multi-stage axle or a multi-stage transaxle transmission, where the gear assembly acts as a system of a plurality of reduction sets. The gear assembly 202 may be formed of at least two reduction sets that may reduce the rotational speed (e.g., rotation per minute (RPM)) and increase the torque. The reduction sets may be referred to herein as stages. The stages may be gearsets. However, the stages may also be another form of reduction set or other power transfer set, such as a belt and pulley set. There may be at least a first stage 204. The first stage 204 may include gears, such as fixed gears. It is also to be appreciated that the gear assembly 202 may be used for another gear system that is not a transmission, such as in a gearbox that is not a transmission.

As an example, the gear enclosure 203 of gear assembly 202 may include at least two shafts. The two shafts include a first shaft 208 and a second shaft 210. The first stage 204 may be supported by the first shaft 208 and the second shaft 210. The first shaft 208 may be an input to the first stage 204. The second shaft 210 may be an output for the first stage 204. The first stage 204 may drivingly couple the first shaft 208 to the second shaft 210. The first shaft 208 may be centered on a first axis 216. The second shaft 210 may be centered on a second axis 218. The first axis 216 and second axis 218 may be parallel with one another. The first stage 204 may traverse the first axis 216 to the second axis 218.

The first and second shafts 208, 210 may be hollow. The first shaft 208 may include at least a first passage 211. The second shaft 210 may include at least a second passage 213. The first passage 211 may have a length parallel with the first axis 216 when the first shaft 208 is parallel with and/or centered around the first axis 216. The second passage 213 may have a length parallel with the second axis 218 when the second shaft 210 is parallel with and/or centered around the second axis 218. The first and second axes 216, 218 may be horizontal, and perpendicular to a vertical axis and the direction of gravity. A plurality of additional passages, channels, and openings of the first shaft 208 may fluidly couple the first passage 211. A plurality of additional passages, channels, and openings of the second shaft 210 may fluidly couple the second passage 213.

The first shaft 208 may drivingly couple a first input shaft to gear assembly 202. The first input shaft is an input that transmits rotational energy to the gear assembly 202. The first input shaft may also be a first input to the transmission 108. For example, the first input shaft to the gear assembly 202 may be an output shaft 214 of the prime mover 106. The output shaft 214 may be referred to herein as the prime mover output shaft 214. For this example, the prime mover 106 may be an electric machine. For another example, such as if the prime mover 106 is not an electric machine, there may be another mover that is an electric machine with an input to the transmission 108, where the other mover drivingly couples the first shaft 208. Shafts and other components that are drivingly coupled and not directly contacting are represented by dotted lines 220.

However, other configurations of the gearbox are possible. For example, the first input shaft may be a shaft drivingly coupled to output shaft 214 or the output of another reduction set. Additionally, for other configurations, there may be additional stages that may selectively and drivingly couple the first shaft 208 to the second shaft 210. For example, there may be a second stage separate from the first stage 204 that may drivingly and selectively couple the first shaft 208 to the second shaft 210. The second stage may be of a different ratio and effective diameter from the first stage 204. For this or other examples, there may be a third stage separate from the second stage and the first stage 204 that may drivingly and selectively couple the first shaft 208 to the second shaft 210. The third stage may be of a different ratio and effective diameter from the second stage and the first stage 204. For these or other examples, there may be a fourth stage separate from the third stage, the second stage and the first stage 204 that may drivingly and selectively couple the first shaft 208 to the second shaft 210. The fourth stage may be of a different ratio and effective diameter from the third stage, the second stage, and the first stage 204. For these or other examples, there may be a n stage separate from an n–1 stage, the fourth stage, the third stage, the second stage and the first stage 204. The n stage may be of a different ratio and effective diameter from the n–1 stage, the fourth stage, the third stage, the second stage, and the first stage 204

The transmission 108 may be at least a one-speed configuration, where the transmission 108 outputs a rotational speed to an output shaft of the transmission. The second shaft 210 may be drivingly coupled to at least a first output shaft. For example, the first output shaft may be a drive shaft, such as the second driveshaft 122. Rotational energy from the first shaft 208 may be transferred to the second shaft 210 and an output shaft, such as the second driveshaft 122, when selectively and drivingly coupled via the first stage 204. When not selectively and drivingly coupled to the second shaft 210 via the first stage 204, the first shaft 208 may be driven and not output to another shaft. However, other configurations of the gear assembly 202 and gear enclosure 203 are possible. For another example, the transmission 108 may be a two speed transmission enabling a second speed. For this example, the first shaft 208 and second shaft 210 may output to different output shafts, where first shaft 208 may output and drivingly couple to a second output shaft separate from the first output shaft, such as the first driveshaft 113 of FIG. 1. Additionally, for this or other examples, the first shaft 208 and/or second shaft 210 may be output shafts. Additionally, for this or other examples, the first shaft 208 and second shaft 210 may be drivingly and selectively coupled via an additional set or a plurality of additional sets from the first stage 204, such as a second stage. The additional set or plurality of additional sets may be of different ratios than the first stage 204, such that a different speed compared to the first set 204 is output to the second shaft 210 and the first output shaft when the first shaft 208 selectively and drivingly couples to the second shaft 210 via the additional set.

It is to be appreciated, that number of shafts, the number of sets, and the number of speeds output by the transmission 108 may be non-limiting. For other examples, the gear assembly 202 may include more than two shafts. For these examples, the additional shafts of the gear assembly 202 may be hollow as the first and second shafts 208, 210, where each shaft has a passage extending between opposite ends of the respective shaft like as the first and second passages 211, 213. Each additional shaft may be drivingly and selectively coupled to either the first shaft 208 or the second shaft 210. For other examples, the transmission 108 may have additional sets from the first stage 204, where the additional sets may drivingly and selectively couple the first shaft 208 to the second shaft 210, where each of the sets is of a different ratio enabling a different speed. For example, an alternative configuration of the gear assembly 202 may have two sets, such as gearsets, of different ratios that may drivingly and selectively couple the first shaft 208 to the second shaft 210. For example, an alternative configuration of the gear assembly 202 may have three sets of different ratios that may drivingly and selectively couple the first shaft 208 to the second shaft 210. For another example, an alternative configuration of the gear assembly 202 may have four sets of different ratios that may drivingly and selectively couple the first shaft 208 to the second shaft 210. For another example, an alternative configuration of the gear assembly 202 may have five sets of different ratios that may drivingly and selectively couple the first shaft 208 to the second shaft 210. For another example, an alternative configuration of the gear assembly 202 may have six sets of different ratios that may drivingly and selectively couple the first shaft 208 to the second shaft 210. For another example, an alternative configuration of the gear assembly 202 may have seven sets of different ratios that may drivingly and selectively couple the first shaft 208 to the second shaft 210. For another example, an alternative configuration of the gear assembly 202 may have eight sets of different ratios that may drivingly and selectively couple the first shaft 208 to the second shaft 210. In such examples, each of the aforementioned configurations may provide n number of selectable speeds based on the number of sets of gear ratios of the transmission.

For other examples, alternate configurations of transmission 108 and gear assembly 202 with more than two shafts and/or additional stages, may enable greater than two speeds to the output. For example, in an alternate configuration, the transmission 108 may be an eight speed transmission, and the gear assembly 202 may be an eight speed assembly enabling eight speeds, such as an assembly 302 in FIG. 3, as further described below. For another example, the transmission 108 and the gear assembly 202 may enable three speeds. For another example, in an alternative configuration the transmission 108 and the gear assembly 202 may enable four speeds. For another example, in an alternative configuration the transmission 108 and the gear assembly 202 may enable five speeds, such as the assembly 402 of FIG. 4. For another example, in an alternative configuration transmission 108 and the gear assembly 202 may enable six speeds. For another example, in an alternative configuration the transmission 108 and the gear assembly 202 may enable seven speeds. For another example, in an alternative configuration the transmission 108 and the gear assembly 202 may enable nine speeds. For another example, in an alternative configuration transmission 108 and the gear assembly 202 may enable n speeds.

An actuator 222 may selectively and drivingly couple the first stage 204 to the first shaft 208. The actuator 222 may be shiftingly coupled to a shifting rod 224, where the actuator 222 may shift the shifting rod 224 in a direction. The actuator 222 may be one of the actuators 160 of FIG. 1. The actuator 222 may translate the shifting rod 224 along third axis 226. When translated in a first direction, such as toward the front end 132, the shifting rod 224 may drivingly couple the first stage 204 to the first shaft 208. When translated in a second direction, such as toward the rear end 134, the shifting rod may decouple the first stage 204 from the first shaft 208.

The first stage 204 may include at least a first gear 232 and a second gear 234. The first gear 232 may be rotationally coupled to the first shaft 208, and the second gear 234 may be rotationally coupled to the second shaft 210. When rotationally coupled to a shaft, the first gear 232 and second gear 234 may rotate with their respective shafts. At least one of the first gear 232 or the second gear 234 may be supported by bearings, races, and/or bushings, such that the first gear 232 and/or the second gear 234 may rotate freely of the first shaft 208 or the second shaft 210, respectively. The first gear 232 may rotate freely about the first shaft 208 when the first engaging component 240 and the first engagement component 244 are not selectively coupled.

There may be at least one arm and an engagement drivingly coupled to the shifting rod 224 to select reduction sets. The number of arms and engagements drivingly coupled to the shifting rod 224 may be dependent on the number of sets to engage. The first stage 204 may drivingly couple to the first shaft 208 via a first engaging component 240 and first engagement component 244. The first engaging component 240 may shiftingly couple to the shifting rod 224 via a first arm 248. The shifting rod 224 may shift the first engaging component 240 to engage and lock with the first engagement component 244. The first engagement component 244 may drivingly couple to the first gear 232. The first engaging component 240 and first engagement component 244 may form a clutch, such as a synchronizer clutch or a dog clutch.

The gear enclosure 203 may include a sump 228 collecting a work fluid 230. The work fluid 230 may be a lubricant, such as oil. The sump 228 may be located below the gear assembly 202, such that work fluid 230 may be returned to the sump 228 via the force of gravity 260. After lubricating the gears of the first stage 204, work fluid 230 may be returned to the sump 228 via splashing and dripping.

Schematic 200 shows a first flow path 262 may take work fluid 230 from the sump 228. The flow of work fluid 230 on the first flow path 262 may be driven via suction from a first pump 266. Likewise, schematic 200 shows a second flow path 264 may take the work fluid 230 from the sump 228. The flow of work fluid 230 on the second flow path 264 may be driven from suction from a second pump 268. Both the first flow path 262 and second flow path 264 are driven to at least the first and second shafts 208, 210, respectively, via a forced lubrication system.

For an example, components of the transmission 108 and the gear assembly 202 may be lubricated in a method via the first flow path 262. The first flow path 262 may begin at the sump 228. Work fluid 230 may be drawn to the first pump 266. The first pump 266 may increase the pressure of and direct the work fluid 230 to the first shaft 208. A pressure gradient created via the first pump 266 may drive work fluid 230 to the first shaft 208. The first shaft 208 may receive the work fluid 230 via an inlet to the first passage 211. Work fluid 230 on the first flow path 262 may travel through the first passage 211. Work fluid 230 on the first flow path 262 may travel to other fluid passages, openings, and other hollow volumes of the first shaft 208 in fluid communication with the first passage 211. It is to be appreciated that while in the first shaft 208, work fluid 230 on the first flow path 262 may not be driven by a pressure differential or through other means of forced lubrication. While in the first passage 211 and other volumes of the first shaft 208, work fluid may be driven under open channel flow. Work fluid on the first flow path 262 in the first shaft 208 may have a fluid free surface and be driven under the action of applied force, such as forces from the rotation of the first shaft 208. The rotation of the first shaft 208 may drive work fluid outward in a radial direction from the first passage 211 and the first shaft 208 via a plurality of channels and openings. Lubricant driven radially outward from the first shaft 208 may lubricate the components positioned about the first shaft 208, such as the first gear 232, the first engagement component 244, and the first engaging component 240. Lubricant on the first flow path 262 may also be driven to lubricate other components of the first stage 204. For example, lubricant on the first flow path 262 may be carried by the first gear 232 to lubricate the second gear 234 and the mesh between the first gear 232 and second gear 234. Work fluid on the first flow path 262 may be returned to the sump 228, after lubricating components positioned around the first shaft 208 or part of the first stage 204. Work fluid 230 on the first flow path 262 may also exit the first passage 211 via an outlet and return to the sump 228.

Components of the transmission 108 and the gear assembly 202 may be lubricated in a second method via the second flow path 264. In one example, the second method may be similar to the first method, however lubricant is driven to and distributed to other components of the gear assembly 202 via the second shaft 210. For example, the second flow path 264 may begin at the sump 228. Work fluid 230 may be drawn to the second pump 268 and directed to the second shaft 210. Rotation of the second shaft 210 may drive work fluid outward in a radial direction from the second passage 213 and the first shaft 208 via a plurality of channels to lubricate components positioned about the second shaft 210. Work fluid on the second flow path 264 may be returned to the sump 228 after lubricating components positioned around the second shaft 210 and may also exit the second passage 213 via an outlet.

It is to be appreciated that the arrangement of the first flow path 262 and second flow path 264 may be non-limiting. For example, the first flow path 262 may be spread by additional channels and openings of the first shaft 208. The additional channels and openings may extend radially from and fluidly couple to the first passage 211. For example, the additional channels and openings may lubricate additional components of transmission sets, such as additional gear sets. Likewise, the additional channels and openings may lubricate additional components of clutches for selectively coupling the first shaft 208 to additional stages. The additional channels and openings may lubricate additional engaging and engagement components separate from the first engaging component 240 and first engagement component 244. The first flow path 262 and additional channels and openings of the first shaft 208 may also direct lubricant to lubricate other supporting elements such as additional bearings, races, and bushings. Similarly, the second flow path 264 may be spread by additional channels and openings of the second shaft 210. The additional channels and openings may extend radially from and fluidly couple to the second passage 213, directing lubricant to other elements such as additional gears, bearings, races, and bushings.

Likewise, the additional channels and openings may lubricate additional components of clutches for selectively coupling the first shaft 208 to additional stages. The additional channels and openings may lubricate additional engaging and engagement components separate from the first engaging component 240 and first engagement component 244.

Likewise, the additional channels and openings may lubricate additional components of clutches, such as additional engaging and engagement components separate from the first engaging component 240 and first engagement component 244.

For an alternate example, the first and second flow paths 262, 264, may be driven by and supplied with fluid via a common pump.

Turning to FIG. 3, it shows a first view 300 of the assembly 302. A set of reference axes 301 are provided for comparison between views shown in FIGS. 3-10. The reference axes 301 indicate a y-axis, an x-axis, and a z-axis. The z-axis may be parallel with a direction of gravity. When referencing direction, positive may refer to in the direction of the arrow of the y-axis, x-axis, and z-axis and negative may refer to in the opposite direction of the arrow of the y-axis, x-axis, and z-axis. A circle may represent an axis of the reference axes 301 that is normal to a view. A filled circle may represent an arrow and axis facing toward, or positive to, a view. An unfilled circle may represent an arrow and an axis facing away, or negative to, a view.

The first view 300 is a sectional view of the assembly 302, where the first view 300 may be taken on a plane parallel with a plane formed by the y-z axis. The assembly 302 has a first side 304 and a second side 306, where the first side 304 is opposite to the second side 306. The assembly 302 comprises a housing 303. The assembly 302 may include a plurality of shafts, such as at least two shafts. The housing 303 may house a plurality of rotational elements including shafts and gears of the assembly 302. The at least two shafts include a first shaft 312 and a second shaft 314. The assembly 302 is a first embodiment of a transmission and/or a gearbox that may enable and output multiple speeds from the same input speed. The assembly 302 is an eight speed assembly, wherein the two shaft scheme may enable at least eight speeds to be output via the assembly.

The first shaft 312 may have a first passage 316, and the second shaft 314 may have a second passage 318. The first passage 316 may extend through a first material 315 of the first shaft 312. The second passage 318 may extend through a second material 317 of the second shaft 314. The first passage 316 and second passage 318 may be machined from their respective materials and shafts. For example, the first passage 316 and second passage 318 may be bored, such as gun drill bored, through the first material 315 and the second material 317, respectively. The first passage 316 may be a blind passage, such as a blind hole. The first passage 316 may extend from an opening at a first end and in the direction of a second end of the first shaft 312. The first end of the first shaft 312 may be opposite the second end of the first shaft 312. Likewise, the second passage 318 may be a blind hole. The second passage 318 may extend from an opening at a first end to and in the direction of a second end of the second shaft 314. The first end of the second shaft 314 may be opposite the second end of the second shaft 314. The first passage 316 and second passage 318 may be fluid passages, such as lubrication lines (e.g., lube lines), for their respective shafts. The first passage 316 and second passage 318 may have lengths extending parallel with the centerlines of the first shaft 312 and second shaft 314, respectively. The first passage 316 and second passage 318 may be central passages for the first shaft 312 and the second shaft 314, respectfully. As central passages, the first passage 316 and second passage 318 may be positioned approximately radially about and coaxial with the centerlines of the first shaft 312 and second shaft 314, respectively.

The first passage 316 may be parallel with the first axis 308 when the first shaft 312 is centered around the first axis 308. The first passage 316 may be coaxial with the first axis 308 when the first shaft 312 is centered around the first axis 308, such that the first passage 316 is positioned approximately radially around the first axis 308. The second passage 318 may be parallel with the second axis when the second shaft 314 is center around the second axis 310. Work fluid such as lubricant may be transported by the first passage 316 and second passage 318.

The first passage 316 may receive fluid via at least a first opening, such as a port 321. The port 321 may be positioned nearest to the second side 306 of the assembly 302. The port 321 may selectively allow lubricant and other fluids into the first passage 316. When engaged or opened, the port 321 may fluidly couple a supply of lubricant. When disengaged/closed, the port 321 may seal the first passage 316 from the supply of lubricant. Lubricant may enter first passage 316 via the port 321 from the second side 306. Lubricant may travel, such as via flowing, from the second side 306 to the first side 304 via a first flow path 320 upon entering the first passage 316. Fluid may travel on a flow path through the second shaft 314 via the second passage 318. Similar to the first passage 316, the second passage 318 may receive fluid via a second opening. For an example, the second flow path through the second passage 318 may be parallel and in the same direction as the first flow path 320, where the second flow path travels from the second side 306 to the first side 304. Alternatively, for another example, a second flow path through the second passage 318 may be parallel and in an opposite direction to the direction of the first flow path 320, where the second flow path travels from the first side 304 to the second side 306.

For an example, the first shaft 312 and/or second shaft 314 may be integrated into a forced lubrication system of assembly 302. As part of a method of lubricating the assembly 302, the forced lubrication system may transport lubricant to the openings of the first shaft 312 and/or second shaft 314 via a method of forced lubrication, such via pressure differentials, such as pressure differentials specific to the first shaft 312 and/or second shaft 314. Each pressure differential may be generated via a pump for a first example or from pressure head such as via the force of gravity. For example, lubricant may be transported to the port 321 via a pressure differential. Upon entering the first passage 316 or the second passage 318, fluid may be driven under open channel flow and not via pressure differentials or other forced methods of lubrication, such as described above with reference to FIG. 2.

The first shaft 312 may have a plurality of first shaft channels that extend radially outward from the first passage 316 to the outer surfaces of the first shaft 312. Each channel may include a first shaft outer opening and a first shaft inner opening, each respectively positioned radially about, contiguous, and flush with, the outer surface and the inner surface of the first shaft 312. The inner surface of the first shaft may be the surface of the first passage 316. Lubricant may be expelled in a radially outward direction from the first passage 316 and the first shaft 312 via the first shaft channels via a plurality of tributaries of the first flow path 320. Lubricant on the first flow path 320 not expelled via the first shaft channels through the tributaries may exit the first passage 316 and the first shaft 312 via the second opening.

Likewise, the second shaft 314 may include a plurality of second shaft channels that extend radially outward from the second passage 318 to the outer surfaces of the second shaft 314, which may be arranged similarly to the first shaft channels of the first shaft 312. Each channel may include a second shaft outer opening and a second shaft inner opening, each respectively positioned radially about, contiguous, and flush with, the outer surface and the inner surface of the second shaft 314. The inner surface of the second shaft 314 may be the surface of the second passage 318. Lubricant may be expelled in a radially outward direction from the second passage 318 and the second shaft 314 via the second shaft channels via a plurality second of tributaries. Lubricant not expelled by the second shaft channels through the second tributaries may exit the second passage 318 and the second shaft 314 via the fourth opening.

The first shaft channels and the second shaft channels may supply lubricant to a plurality of consumers positioned, respectively, about first shaft 312 and the second shaft 314, including bearings, races, bushings, gears, meshes between gears, clutches as well as mechanical systems having moving/rotating/rolling/sliding components.

The assembly 302 may have one or more transmission sets, such as gearsets, that may rotationally and drivingly couple the first shaft 312 to the second shaft 314. For an example embodiment the assembly may have eight sets, where each set may be of a different ratio enabling a different speed output when drivingly coupling the first shaft 312 to the second shaft 314. The eight sets may include a first gearset 322, second gearset 324, third gearset 326, a fourth gearset 328, a fifth gearset 332, a sixth gearset 334, a seventh gearset 336, and an eighth gearset 338. Each gearset or other set of the transmission sets may be complementary to a clutch assembly, where the complementary clutch assembly includes a complementary clutch that may selectively couple the set to either the first shaft 312 or the second shaft 314. When selectively coupled to the first shaft 312 or the second shaft 314 via a complementary clutch, a set may drivingly couple the first shaft 312 to the second shaft 314. The first gearset 322 and second gearset 324 may be complementary to a first clutch assembly 342. The third gearset 326 and fourth gearset 328 may be complementary to a second clutch assembly 344. The fifth gearset 332 and sixth gearset 334 may be complementary to a third clutch assembly 346. The seventh gearset 336 and eighth gearset 338 may be complementary to a fourth clutch assembly 348. The first clutch assembly 342 may selectively couple the first gearset 322 or the second gearset 324 to the second shaft 314. The second clutch assembly 344 may selectively couple the third gearset 326 or the fourth gearset 328 to the second shaft 314. The third clutch assembly 346 may selectively couple the fifth gearset 332 or the sixth gearset 334 to the first shaft 312. The fourth clutch assembly 348 may selectively couple the seventh gearset 336 or the eighth gearset 338 to the first shaft 312. The first clutch assembly 342, second clutch assembly 344, third clutch assembly 346, and the fourth clutch assembly 348 may be synchronizers. The fifth gearset 332, the sixth gearset 334, the seventh gearset 336, and the eighth gearset 338 may include idler gears.

A plurality of bearings, bearing assemblies, and bushings may support components and features of the assembly 302. A bushing 350 may be inserted near the port 321 near the second side 306 (e.g., the right side). The bushing 350 may fit to the first passage 316. The bushing 350 may be arranged between the first side 304 and the port 321 along the first axis 308. The bushing 350 may be positioned opposite to an end of the port 321 that is nearest to the second side 306. The bushing 350 may prevent back flow of fluid in the direction of the second side 306 through the port 321.

A first bearing assembly 352 may support and be positioned about the first shaft 312. The first bearing assembly 352 may be positioned around, such as radially about, and be in surface sharing contact with the first shaft 312. A second bearing assembly 354 may support and be positioned about the second shaft 314. The second bearing assembly 354 may be positioned around, such as radially about, and be in surface sharing contact with the second shaft 314. The first and second bearing assemblies 352, 354 may include an inner race an, outer race, and a plurality of bearings. For an example first and second bearing assemblies 352, 354 may include ball bearings. Alternatively, the first and second bearing assemblies 352, 354 may include needle bearings or roller bearings.

In addition to the bearings of the first and second bearing assemblies 352, 354, the assembly 302 may include a plurality of third bearings 356, a plurality of fourth bearings 358, a sixth bearing 362, a seventh bearing 364, a plurality eighth bearings 366, a plurality of ninth bearings 368, a plurality of tenth bearings 370, a plurality of eleventh bearings 372, and a plurality of twelfth bearings 374. The third bearings 356, the fourth bearings 358, fifth bearings 360, the eighth bearings 366, the ninth bearings 368, the tenth bearings 370, the eleventh bearings 372, and the twelfth bearings 374 may be roller bearings and/or needle bearings, such as needle roller bearings. The sixth bearings 362 and the seventh bearings 364 may be cylindrical roller bearings.

The third bearings 356, fourth bearings 358, the fifth bearings 360, the sixth bearing 362, and the twelfth bearings 374 may be positioned radially around the second shaft 314. The third bearings 356 may be positioned radially between the second shaft 314 and a complementary gear of the first gearset 322. The third bearings 356 may support and allow the complementary gear to spin about the second shaft 314. The fourth bearings 358 may be positioned radially between the second shaft 314 and a complementary gear of the second gearset 324. The fourth bearings 358 may support and allow the complementary gear to spin about the second shaft 314. The fifth bearings 360 may be positioned radially between the second shaft 314 and a complementary gear of the third gearset 326. The fifth bearings 360 may support and allow the complementary gear to spin about the second shaft 314. The twelfth bearings 374 may be positioned radially between the second shaft 314 and a complementary gear of the fourth gearset 328. The twelfth bearings 374 may support and allow the complementary gear to spin about the second shaft 314.

The seventh bearing 364, the eighth bearings 366, the ninth bearings 368, the tenth bearings 370, and the eleventh bearings 372 may be positioned radially around the first shaft 312. The eighth bearings 366 may be positioned radially between the first shaft 312 and a complementary gear of the fifth gearset 332. The eighth bearings 366 may support and allow the complementary gear to spin about the first shaft 312. The ninth bearings 368 may be positioned radially between the first shaft 312 and a complementary gear of the sixth gearset 334. The ninth bearings 368 may support and allow the complementary gear to spin about the first shaft 312. The tenth bearings 370 may be positioned radially between the first shaft 312 and a complementary gear of the seventh gearset 336. The tenth bearings 370 may support and allow the complementary gear to spin about the first shaft 312. The eleventh bearings 372 may be positioned radially between the first shaft 312 and a complementary gear of the eighth gearset 338. The eleventh bearings 372 may support and allow the complementary gear to spin about the first shaft 312. The seventh bearing 364, the eighth bearings 366, the ninth bearings 368, the tenth bearings 370, and the eleventh bearings 372 may support and be complementary to the idler gears of their respective gearsets.

The first shaft channels described for the first shaft 312 and first passage 316 include a first channel 375, a second channel 376, a third channel 378, and a fourth channel 380. The first channel 375, the second channel 376, the third channel 378, and the fourth channel 380 may each be feed channels, such as feed holes, that may transport lubricant to consumers. The first channel 375 may supply lubricant to consumers via a first tributary 382 of the first flow path 320. The second channel 376 may supply lubricant to consumers via a second tributary 384 of the first flow path 320. The third channel 378 may supply lubricant to consumers via a third tributary 386 of the first flow path 320. The fourth channel 380 may supply lubricant to consumers via a fourth tributary 388 of the first flow path 320. Consumers supplied with lubricant via the first channel 375 may include the eighth bearings 366, the gears of the fifth gearset 332, and the third clutch assembly 346. Consumers supplied with lubricant via the second channel 376 may include the ninth bearings 368, the gears of the sixth gearset 334, and the third clutch assembly 346. Consumers supplied with lubricant via the third channel 378 may include the tenth bearings 370, the gears of the seventh gearset 336, and the fourth clutch assembly 348. Consumers supplied with lubricant via the fourth channel 380 may include the eleventh bearings 372, the gears of the eighth gearset 338, and the fourth clutch assembly 348. There may be a plurality the first channels 375, the second channels 376, the third channels 378, and the fourth channels 380.

It is to be appreciated that the configuration of the assembly 302 may be non-limiting, where the setup may include a multi-shaft scheme with more shafts than two that may be rotationally coupled via the gearsets of the assembly. It is also to be appreciated that the assembly 302 may be of a configuration enabling the output of less speeds than eight or more speeds than eight. Similar to the example described with reference to FIG. 2, alternative configurations of the assembly 302 may enable two speeds and as many as n speeds.

Turning to FIG. 4, a sectional view 400 of an assembly 402 is shown, where the sectional view 400 may be taken on a plane parallel with a plane formed by the y-z axis. The assembly 402 has a first side 404 and a second side 406, where the first side 404 is opposite to the second side 406. The assembly 402 may include a shaft 412 and a plurality of rotational elements 407, including gears, bearings, and the like arranged about the shaft 412 with a common axis of rotation 408. The axis of rotation 408 may be perpendicular to the direction of gravity. Similar to the assembly 302 of FIG. 3, the assembly 402 is a second embodiment of a transmission and/or a gearbox that may enable and output multiple speeds from the same input speed. The assembly 402 may be a five-speed assembly configured to enable at least five speeds to be output via the assembly 402.

The shaft 412 may have a passage 416 such that the shaft 412 is hollow. The passage 416 may be a blind passage, such as a blind hole. Fluid (e.g., oil, work fluid 230 of FIG. 2) may be received by the passage 416 via a nozzle 452 at an inlet 414 at the second side 406. The passage 416 may be adapted to receive a fluid distribution device, such as the fluid distribution device 502 of FIGS. 5-10, as further described below. The assembly 402 may include a bushing 450 positioned within the shaft 412 near the inlet 414, wherein the bushing 450 prevents backwards flow (e.g., out of the inlet 414 rather than into the inlet 414).

Further, the shaft 412 may include channels 420 which connect the passage 416 to the exterior of the shaft 412. In this way, the channels may fluidically couple the passage 416 with the outside of the shaft 412. Each of the channels 420 may include an outer opening and an inner opening, each respectively positioned radially about, contiguous, and flush with, the outer surface and the inner surface of the shaft 412. The inner surface of the shaft 412 may be a cylindrical surface that defines the passage 416. The outer surface of the shaft 412 may be a cylindrical surface that faces outwards towards the plurality of rotational elements 407.

The channels 420 may include a first channel 421 positioned at a first axial position along the shaft 412, a second channel 422 positioned at a second axial position along the shaft 412, a third channel 423 positioned at a third axial position along the shaft 412, and a fourth channel 424 positioned at a fourth axial position along the shaft 412. The channels 420 may further include more channels, including some channels that are not visible in the sectional view 400. The first channel 421, the second channel 422, the third channel 423, and the fourth channel 424 may extend axially along and be centered about a first axis 431, a second axis 432, a third axis 433, and a fourth axis 434, respectively. In this way, the first channel 421, the second channel 422, and the third channel 423 may be positioned radially around the respective axes. The first axis 431, the second axis 432, the third axis 433, and the fourth axis 434 may intersect the axis of rotation 408. As such, the channels 420 may be radially oriented with respect to the axis of rotation 408 such that the first channel 421, the second channel 422, and the third channel 423 are perpendicular to the passage 416.

The channels 420 may be spaced apart axially with regards to the axis of rotation 408. For example, the channels 420 may be equidistantly positioned from one another in the y-direction along the axis of rotation 408 such that a first distance between the first axial position and the second axial position is approximately equal to a second distance between the second axial position and the third axial position, and a third distance between the third axial position and the fourth axial position. Additionally or alternatively, the channels 420 may be positioned relative to the axis of rotation 408 according to the y-position of intended consumers, such as the plurality of rotational elements 407 including a first bearing 441, a second bearing 442, a third bearing 443, and a fourth bearing 444. For example, the channels 420 may each be associated with a bearing. The first channel 421 may deliver fluid to the first bearing 441, the second channel 422 may deliver fluid to the second bearing 442, the third channel 423 may deliver fluid to the third bearing 443, and the fourth channel 424 may deliver fluid to the fourth bearing 444.

Further, the channels 420 may be oriented at different angles. For example, the channels 420 may be oriented in parallel x-z planes with different angles with the z-axis. For example, the first channel 421 may extend along the first axis 431 in a negative z-direction from the axis of rotation 408, the second channel 422 may extend along the second axis 432 in a negative x-direction from the axis of rotation 408, and the third channel 423 may extend along the third axis 433 in a positive z-direction from the axis of rotation 408. As noted above, there may be additional channels 420 not visible in the sectional view 400. For example, there may be a fifth channel at the second axial position, wherein the fifth channel is centered on a fifth axis which extends perpendicularly from the axis of rotation 408 (e.g., in a positive x-direction). In this way, there may be a plurality of channels 420 centered on axes which are oriented in parallel x-z planes and have different angles with the z-axis.

Further still, there may be a different number of channels 420 at each axial position along the shaft 412. For example, the shaft 412 may be configured to receive a fluid distribution device according to the present disclosure, as further described below, such that there may be four channels 420 axially positioned along the shaft 412 to deliver fluid to the first bearing 441, three channels 420 axially positioned along the shaft 412 to deliver fluid to the second bearing 442, two channels 420 axially positioned along the shaft 412 to deliver fluid to the third bearing 443, and one channel 420 axially positioned along the shaft 412 to deliver fluid to the fourth bearing 444. The channels 420 at each axial position (e.g., the first axial position, the second axial position, the third axial position, or the fourth axial position) may be angularly equally spaced from one another. For example, with four channels at a given axial position, the four channels may be spaced apart by 90 degrees. In another example, with three channels at a given axial position, the three channels may be spaced apart by 120 degrees. In another example, with two channels at a given axial position, the two channels may be 180 degrees apart.

In other examples, there may be a different number of channels in the shaft. The number of channels in the shaft may depend on the number of consumers. For example, in a gearbox with six bearings where lubrication is desired, there may be six or more channels. Further, in at least some examples, two or more of the channels 420 may have the same angle with a plane comprising the z-axis and the axis of rotation 408, such as the third channel 423 and the fourth channel 424.

The assembly 402 may be used to deliver fluid to each of the first bearing, 441, the second bearing 442, the third bearing 443, and the fourth bearing 444 in order to provide adequate lubrication and cooling effect thereto. However, with the configuration shown in FIG. 4, more fluid may be received by the first bearing 441 via the first channel 421 than the other bearings via the other channels because the first channel 421 is closer to the inlet 414. Thus, a desired volumetric flow rate to each of the bearings (e.g., above a threshold where adequate lubrication and cooling is observed) may not be delivered by the assembly 402 alone without increasing volume demand. For example, pumping four times the desired volumetric flow rate into the passage 416 may not result in the desired flow rate reaching all four of the bearings, especially the fourth bearing 444. As described above, centrifugal force from the rotational movement of the shaft 412 may cause more fluid to exit the shaft through the first channel 421 than the second channel 422, more from the second channel 422 than the third channel 423, and so on in an increasing order of channel distance from the inlet 414. Delivering a greater total volumetric flow rate may overcome the unequal distribution of fluid, resulting in at least the desired volumetric flow rate being delivered to each of the four bearings. However, an undesired fluid buildup may occur with overabundant flow. For example, excess fluid may pool in a transmission sump (e.g., sump 228 of FIG. 2) and gears may experience drag loss due to rotating through fluid in the sump, thereby decreasing efficiency of the assembly 402 and the efficiency of a system (e.g., a vehicle) in which the assembly 402 is incorporated.

A fluid distribution device may be added to the assembly 402 in order to distribute the fluid in more equal volumes through each of the channels 420. Thus, a lower volume of fluid may be adequate to deliver the desired volumetric flow rate to each of the bearings using the fluid distribution device. By reducing fluid volume, less fluid buildup may occur in undesirable locations in the assembly, thereby increasing the efficiency (e.g., decrease power losses of the assembly) and reducing resource demand. Thus, a fluid distribution device being integrated into the assembly 402 may result in reduced fluid volume demands and increased efficiency. An example of such a fluid distribution device is shown in FIGS. 5A-9.

Turning to FIG. 5, a cross sectional view of a fluid distribution system 500, including a fluid distribution device 502 and a hollow shaft 512, is schematically depicted. The fluid distribution system 500 may be incorporated into a forced lubrication system in a mechanical system, such as the assembly 302 and the assembly 402 of FIGS. 3 and 4, respectively. The fluid distribution system 500 may be incorporated in a mechanical system having moving/rotating/rolling/sliding components (e.g., gears and/or bearings) arranged about one or more shafts, such as the assembly 302 of FIG. 3 or the assembly 402 of FIG. 4. For example, a forced lubrication system of a transmission in a vehicle (e.g., the transmission 108 of the vehicle 100 of FIG. 1) may include the fluid distribution system 500. The vehicle may include a controller (e.g., the controller 156 of FIG. 1) with instructions stored in memory therein (e.g., non-transitory memory) that when executed cause the transmission to rotate the hollow shaft 512 and the fluid distribution device 502 above a threshold angular speed, as further described below.

Such components which receive fluid from a fluid distribution system, such as the fluid distribution system 500, for cooling and/or lubrication may be referred to herein as consumers. For example, there may be two or more consumers (e.g., components such as needle roller bearings that are external to the hollow shaft 512) arranged about each shaft (e.g., the hollow shaft 512). Fluid may be delivered to an inlet 514 of the hollow shaft 512, for example via pressure differential. The pressure differential may be generated via a pump, such as the first pump 266 or the second pump 268 of FIG. 2, adapted to transfer fluid into the inlet 514. Further, the fluid may be transferred into the hollow shaft 512 at room temperature (e.g., ambient temperature) such there is not a pressure gradient along the hollow shaft 512. Upon entering the shaft 512, fluid may be driven under open channel flow and not via pressure differentials or other forced methods of lubrication, such as described above with reference to FIG. 2. In this way, the fluid may flow through the fluid distribution system 500 according to open channel flow with a free-surface of the fluid. Further still, the fluid distribution system 500 may be adapted to direct the fluid towards each of the components in approximately equal amounts (e.g., volumetric flow rates). Thus, adequate fluid amounts may be delivered to each of the two or more consumers arranged about the hollow shaft 512 and fluid volume demands may be reduced.

The fluid distribution device 502 may be inserted into the hollow shaft 512 such that the fluid distribution device 502 and the hollow shaft 512 are coaxial. The fluid distribution device 502 may be axially fixed to the hollow shaft 512 via a shoulder 532. Additionally or alternatively, the fluid distribution device may be axially fixed within the hollow shaft 512 with a circlip 534. Additionally or alternatively, the fluid distribution device may be axially fixed with the hollow shaft 512 with a snap ring, retaining ring, and/or other fastener. The fluid distribution device 502 may include a cartridge 550 and two or more pipes 560 secured to the cartridge (e.g., via adhesive, fitting, or the like). The fluid distribution device 502 may be adapted to collect fluid in an annular volume in the cartridge 550 and distribute approximately equal amounts of fluid through each of the pipes 560.

The hollow shaft 512 may be an embodiment of the shaft 412 of FIG. 4. As such, the hollow shaft 512 may include a passage 516, which may be a bore formed coaxially into the hollow shaft 512 such that the hollow shaft 512 is hollow and centered about an axis 508. The axis 508 may be an axis of rotation. Further, the axis 508 may be horizontal such that the axis 508 lies in a plane perpendicular to the direction of gravity. Thus, the hollow shaft 512 may be horizontal with respect to the gravitational field. The fluid distribution device 502 may be positioned within the hollow shaft 512. Specifically, the fluid distribution device 502 may be positioned in the passage 516 such that the fluid distribution device 502 is circumferentially surrounded by the hollow shaft 512.

The hollow shaft 512 may further include two or more radial channels 520 which may be through holes arranged radially with respect to the axis 508 and axially spread apart along the hollow shaft 512. In at least some examples, the radial channels 520 may all have approximately the same geometry and dimensions. The radial channels 520 may each be defined by an outer opening, an inner opening, and a cylindrical inner surface therebetween. For example, a third channel 523 may be defined by an outer opening 524 of an outer surface 505 of the hollow shaft 512, an inner opening 528 of an inner surface of the hollow shaft 512 (e.g., surface that defines the passage 516), and a cylindrical inner surface 529 that connects the outer opening 524 and the inner opening 528. The radial channels 520 may extend through the thickness of the shaft and fluidly connect the passage 516 to the exterior of the shaft. In this way, fluid may be delivered to consumers after flowing into the inlet 514, through the fluid distribution device 502, and through the radial channels 520 to areas outside of the hollow shaft 512.

A passage diameter 506 of the passage 516 may be significantly larger than a channel diameter 526 of the radial channels 520. For example, the passage diameter 506 may be approximately 30 mm and the channel diameter 526 may be approximately 2 mm. Further, the inlet opening diameter 554 may be approximately 15 mm. In this way, the passage diameter 506 may be large enough to fit the fluid distribution device 502. Further, a 2 mm channel diameter 526 may be appropriate for delivering a desired flow rate with a pressure differential of 0.2-0.3 bar between the passage 516 and the exterior of the hollow shaft 512. In other examples, the passage diameter 506 may be inclusively between 15 mm and 40 mm. Further, a cartridge diameter 556 of the cartridge 550 may be approximately the same as the passage diameter 506 such that the cartridge 550 is precisely fit within the passage 516. For example, a clearance between the fluid distribution device 502 and the hollow shaft 512 (e.g., a difference between the cartridge diameter 556 and the passage diameter 506) may be inclusively between 0.1 mm and 0.2 mm. In this way, fluid may not flow in the clearance between the fluid distribution device 502 and the hollow shaft 512. In at least some examples, an inner pipe diameter 566 of the pipes 560 may be smaller than the cartridge diameter 556 and greater than the channel diameter 526. The pipes 560 may further have an outer diameter 569. The outer diameter 569 is small enough that the pipes 560 are spaced away from the inner surface of the passage 516.

There may be at least one channel 520 per consumer. The radial channels 520 may fluidly connect the passage 516 and the consumers arranged about the hollow shaft 512. Further, the radial channels 520 may be arranged along the hollow shaft 512 by distances from the inlet 514 according to axial positions of the consumers relative to the hollow shaft 512. For example, the outer opening 524 may be adjacent to, or sufficiently close to, a consumer. In this way, fluid may be delivered specifically to the consumer. Thus, the hollow shaft 512 may deliver fluid specifically to locations of consumers, however the hollow shaft 512 alone may not be able to balance flow rates to each of the radial channels 520. The fluid distribution device 502 may be inserted into and/or integrated with the hollow shaft 512 to form the fluid distribution system 500. The fluid distribution device 502 may deliver fluid to the consumers with more evenly distributed volumetric flow rates to each consumer arranged about the hollow shaft 512. The fluid distribution device 502 may fluidly connect the inlet 514 and the passage 516, such that fluid flows into the inlet 514, through the fluid distribution device 502, into the passage 516, through the radial channels 520, and to the consumers. Alternatively, the fluid distribution device 502 may be received by, such as being inserted into, a different hollow shaft comprising a coaxial passage and a plurality of radial channels fluidly connecting the passage to consumers arranged about the hollow shaft.

Each pipe 560 may deliver fluid within a threshold axial distance from at least one channel 520. The threshold axial distance may be a difference in y-positions of the referenced components and may not account for angular distance, distance along the x-direction or along the z-direction. The threshold axial distance may be greater than and not equal to zero. Thus, the threshold axial distance may be referred to herein as a threshold non-zero axial distance. For example, a first portion of the fluid entering through the inlet 514 may flow through a first pipe 561 to within the threshold axial distance from the first channel 521, a second portion of the fluid entering through the inlet 514 may flow through a second pipe 562 to within the threshold axial distance from the second channel 522, and a third portion of fluid entering through the inlet 514 may flow through a third pipe 563 to within the threshold axial distance from the third channel 523. As such, a length 564 of each pipe 560 may correspond to an axial position of a corresponding channel 520 such that upon inserting the fluid distribution device 502 into the hollow shaft 512, a plurality of pipe outlets 570 of the pipes 560 are sufficiently near (e.g., within the threshold difference from) the corresponding radial channels 520. Further, the lengths 564 may be short enough that the pipe outlets 570 are not further from the inlet 514 than the corresponding radial channels 520. Each of the pipe outlets 570 may be within the threshold axial distance of one or more radial channels 520 that are not closer to the inlet 514 than the pipe outlet 570. In this way, the pipes 560 may not block corresponding radial channels 520 so that clogging is prevented. For example, the threshold axial distance may be approximately 3 mm. In such an example, each pipe 560 may extend with length 564 such that the pipe opening 570 thereof is spaced axially away from the corresponding radial channels 520 by less than or approximately equal to 3 mm and the pipe 560 does not extend axially beyond the corresponding radial channels 520. Thus, the lengths 564 of the pipes may correspond to axial positions of the radial channels 520 axially spread apart along the hollow shaft 512.

Further, a first number of radial channels 520 located at an axial position along the hollow shaft 512 may be greater than a second number of pipes 560 that extend from the cartridge 550 beyond the axial position. In this way, the second number of pipe outlets 570 spaced further away from the inlet opening 514 than the radial channels 520 at the axial position may be less than the first number. For example, the first number may be one more than the second number, in at least some examples.

As described above, there may be at least one channel 520 directed towards each consumer arranged about the hollow shaft 512. In this way, a number of radial channels 520 may depend on a number of consumers. Further, there may be at least one pipe 560 for each consumer, and the number of radial channels 520 may depend on the number of pipes 560. In examples wherein more than one channel 520 is approximately the same axial distance from the inlet 514, a single pipe 560 may correspond to each of the radial channels 520 which are approximately the same axial distance from the inlet 514. Thus, there may be fewer pipes 560 than radial channels 520. For example, a number of channels at an axial distance from the inlet 514 may be greater than a number of pipes 560 which extend axially further from the inlet 514 than the axial distance. In such an example, there may be one or more channels at the same axial distance as (and including) the third channel 523 because no pipes extend beyond the third channel 523, two or more channels at the same axial distance as (and including) the second channel 522 because the third pipe 563 extends beyond the second channel 522, and three or more channels at the same axial distance as (and including) the first channel 521 because the second pipe 562 and the third pipe 563 extend beyond the first channel 521. When two or more radial channels 520 are at a same axial distance, the two or more radial channels 520 may be radially arranged with approximately equal angles therebetween. In this way, clogging of radial channels 520 due to radial pipe 560 placement may be prevented, regardless of a radial position of the fluid distribution device 502 relative to the hollow shaft 512. Thus, radial misalignment of the pipes 560 and the corresponding radial channels 520 may not affect the ability of the fluid distribution system 500 to distribute fluid. The fluid distribution device 502 may be axially and rotationally coupled to the hollow shaft 512 with any angular position of the fluid distribution device 502 relative to the hollow shaft 512 with the channel arrangement described above.

Further, the first portion of fluid, the second portion of fluid, and the third portion of fluid may be approximately equal amounts (e.g., volumetric flow rates), as described further below. Thus, approximately equal amounts of fluid may flow through the first channel 521, the second channel 522, and the third channel 523. In this way, approximately equal amounts of fluid may be delivered to each consumer to which the radial channels 520 correspond. Approximately even distribution of fluid may allow for a desired amount of fluid to be delivered to each consumer for adequate cooling and lubrication effects with reduced fluid volume demands compared to operation of the hollow shaft 512 without the fluid distribution device 502. By reducing fluid volume, resource demand may be reduced and efficiency may be increased for a system incorporating the fluid distribution system 500 including the fluid distribution device 502.

Figure 6:
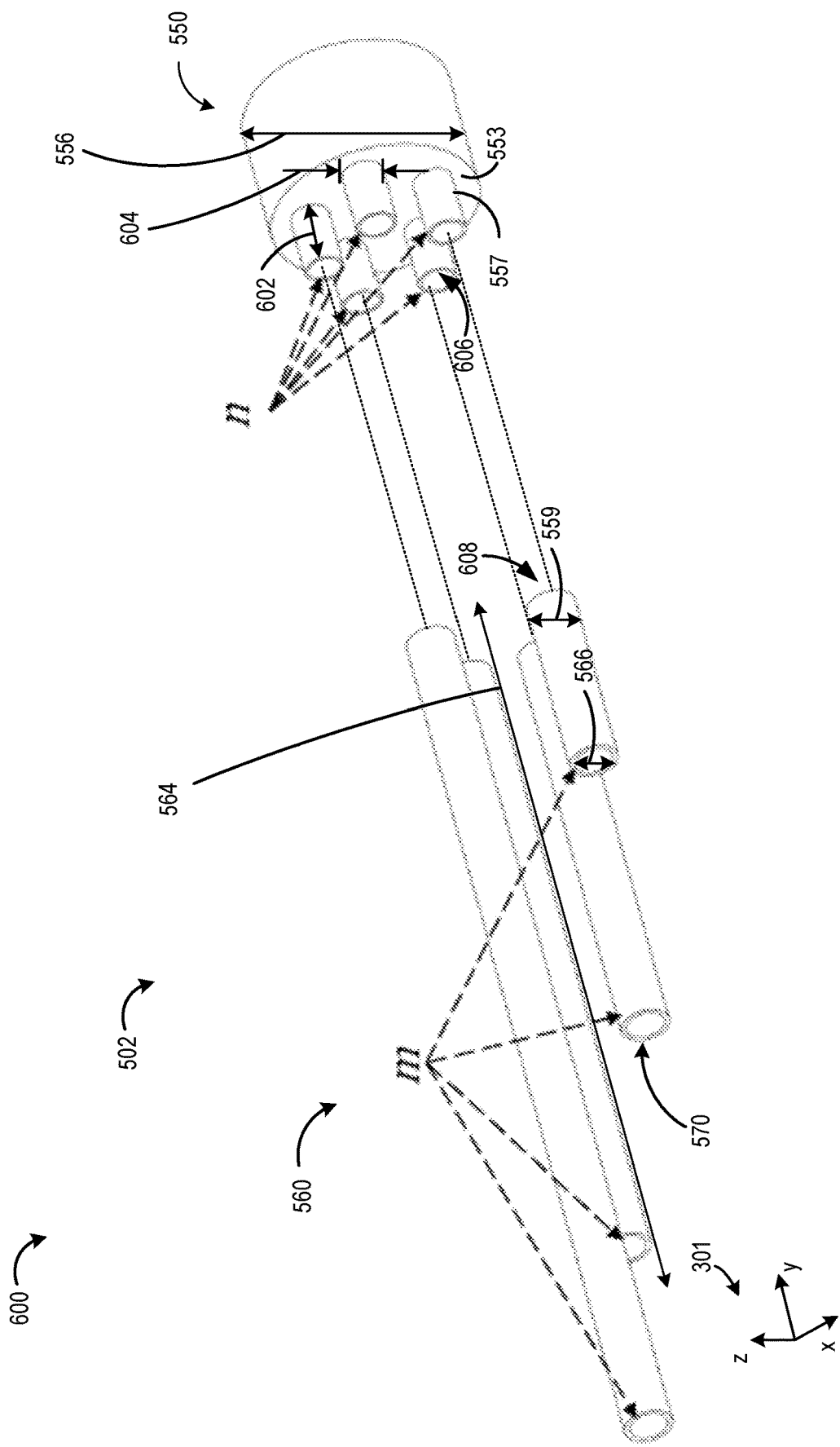
FIG. 6 shows a cartridge and pipes of the fluid distribution device.

Now referencing FIG. 6 in addition to FIG. 5, an exploded view 600 of the fluid distribution device 502 is shown, including the cartridge 550 and the pipes 560. A number of pipes 560 and the lengths 564 thereof may be related to (e.g., correspond to) the number and positions of the radial channels 520 as described above. Further, a shape of the cartridge 550 may determine a maximum number of pipes 560 which may be coupled to the cartridge 550.

The cartridge 550 may include a cylindrical base with a hollow interior 551 defined by a first circular side 555, a second circular side 553, and a cylindrical wall therebetween, wherein the first circular side 555 and the second circular side 553 are parallel. The cartridge 550 may further include a plurality of tubes 557 (e.g., two or more) integrally formed with and protruding from the cylindrical base. The tubes 557 may be axially oriented relative to the cylindrical base. The first circular side 555 may comprise a cartridge inlet opening 552 with an inlet diameter 554 smaller than the cartridge diameter 556. For example, the passage diameter 506 may be 30 mm, the cartridge diameter 556 may be approximately the same as the passage diameter 506, and the inlet diameter 554 may be 15 mm. The second circular side 553 may comprise two or more tube inlet openings 558 from which the tubes 557 extend, with a tube opening diameter 559 for each tube of the tubes 557. In this way, the tube inlet openings 558 may be axially opposite the cartridge inlet opening 552. The tube inlet openings 558 may each define an end of one of the tubes 557 such that an inner diameter of the tubes 557 is approximately the tube opening diameter 559. The tubes 557 may each extend from the tube inlet openings 558 parallel to the y-axis by a distance 602 and end at tube outlet openings 606. In other examples, the tubes 557 may extend by different distances than each other. An outer diameter 604 of the tubes 557 may be approximately the same as the inner pipe diameter 566. In this way, the pipes 560 may each be positioned over one of the tubes 557 such that a portion of the pipe 560 circumferentially surrounds and is in face sharing contact with at least a portion of the tube 557. Specifically, a second end 608 of each of the pipes 560 may fit over one of the tubes 557, wherein the second end 608 is opposite the pipe opening 570. For a given one of the pipes 560, the second end 608 thereof may be the length 564 away (e.g., along the y-axis) from the pipe opening 570 thereof.

There may be at least as many tubes 557 as pipes 560. In other words, there may not be a greater number of pipes 560 than a number of tubes 557. For example, as shown in FIG. 6, there may be n tubes 557 and m pipes 560, wherein n may be greater than or equal to m. For example, n may be 5 and m may be 4, such that there are five tubes 557 and four pipes 560 as shown. Further, a first number of consumers, a second number of radial channels 520, and a third number of pipes 560 may be related to one another. For example, the second number and the third number may depend on the first number. In some examples, a fluid distribution system may include x consumers, x radial channels 520, x pipes 560, and at least x tubes 557. In other examples, a fluid distribution system may include x consumers, greater than x radial channels 520, x pipes 560, and at least x tubes 557. In still other examples, a fluid distribution system may include x consumers, greater than x radial channels 520, greater than x pipes 560, and at least as many tubes 557 as pipes 560.

As described above, the pipes 560 may each have a length 564, where the length 564 may not be the same for each pipe 560. For example, the length 564 of each pipe may depend on a configuration of a shaft in which the fluid distribution device 502 is positioned (e.g., the hollow shaft 512). The lengths 564 may correspond to axial positions of the radial channels 520. In this way, the pipes 560 may end near the corresponding radial channels 520 such that fluid exiting the pipe outlets 570 may flow subsequently through the corresponding radial channels 520.

Figure 7B:
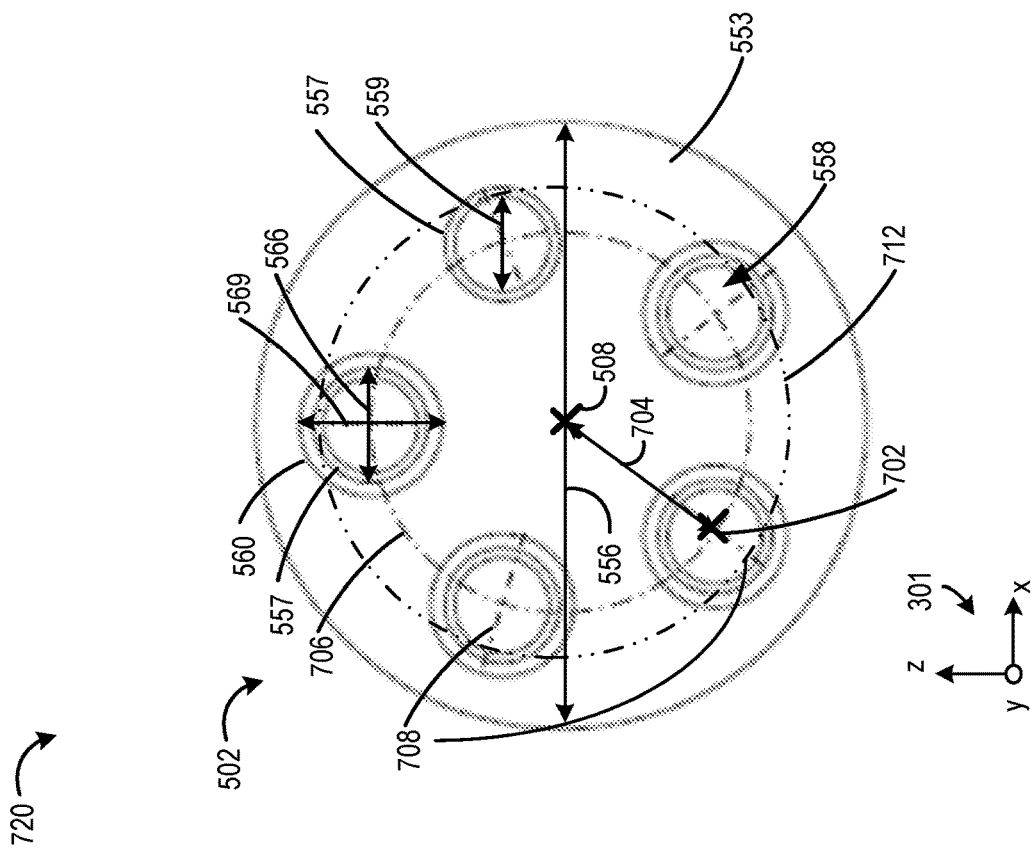
FIGS. 7A and 7B show example schematics of the cartridge and pipes.
Figure 7A:
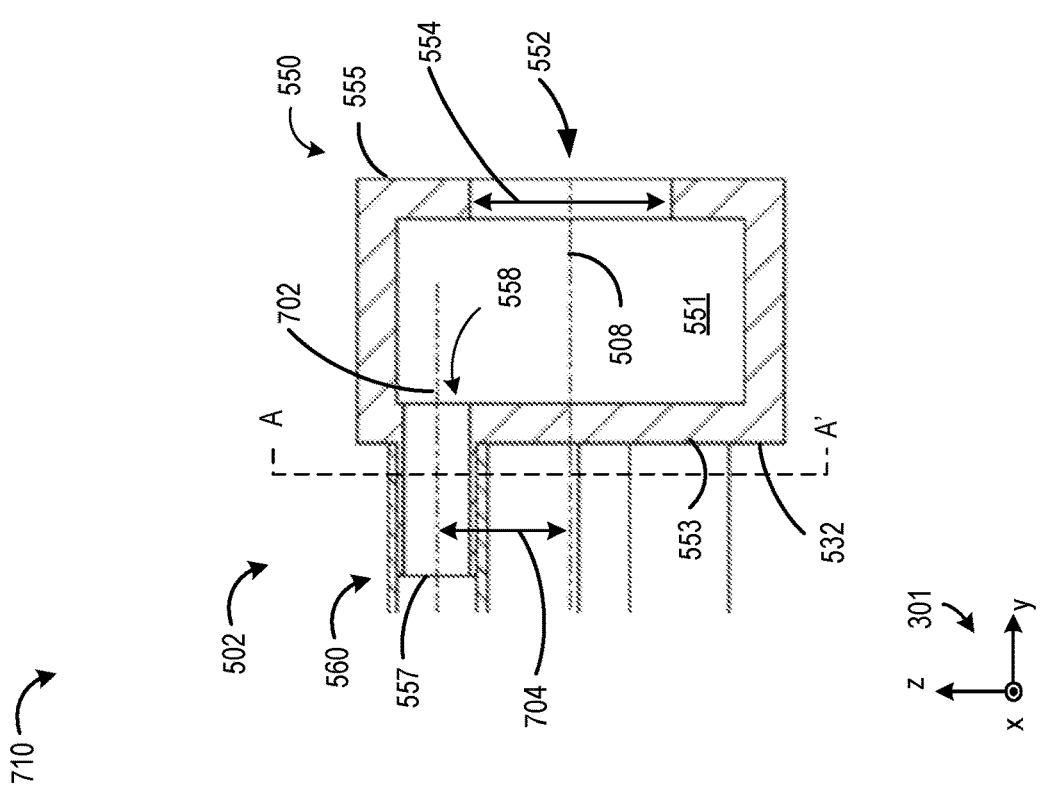

Turning to FIGS. 7A and 7B, a side sectional view 710 and a front sectional view 720 of the fluid distribution device 502 are respectively shown. The front sectional view 720 may be taken along the segment 'A-A' of the side sectional view 710. The tubes 557 may be radially arranged with respect to the axis 508 such that the tubes 557 are spaced equidistantly from the axis 508. For example, the tubes 557 may each be centered axially with one of a plurality of pipe axes 702 which is parallel to the axis 508. Further, each of the pipe axes 702 may be a radial distance 704 from the axis 508. Thus, the pipe axes 702 may be equidistantly spaced form the axis 508. In this way, the tubes 557 may be radially arranged such that centerlines thereof (e.g., the pipe axes 702) align with a circle 706 (with a radius equal to the radial distance 704) that is concentric with the second circular side 553 as shown in the front sectional view 720. Each of the tubes 557 may be centered about one of a set of radial axes 708, such that the radial axes 708 are coincident with a diameters of the tubes 557 and intersect the axis 508. The radial axes 708 may be normal to the circle 706 and the axis 508. Points at which the radial axes 708 intersect the circle 706 may be equidistantly spaced along the circle 706. Further, the pipe axes 702 may intersect the points perpendicularly to the circle 706. In this way, the tubes 557 may be arranged linearly equidistantly from the axis 508 and angularly equidistantly from adjacent tubes 557.

The inlet diameter 554 may be less than a diameter of a circle 712, wherein the circle 712 may be the smallest circle enveloping all of the tube inlet openings 558. The circle 712 may further be centered about the axis 508 and tangential with each of the circular tube inlet openings 558. Thus the inlet diameter 554 may be less than a minimum diameter of the circle 712 which envelops the tube inlet openings 558. In at least some examples, the inlet diameter 554 may further be less than twice the radial distance 704. In this way, the cartridge 550 may be adapted to collect fluid in an annular volume within the cylindrical base that aligns with the tubes 557 such that fluid may flow axially from the annular volume into the tubes 557.

Figure 8:
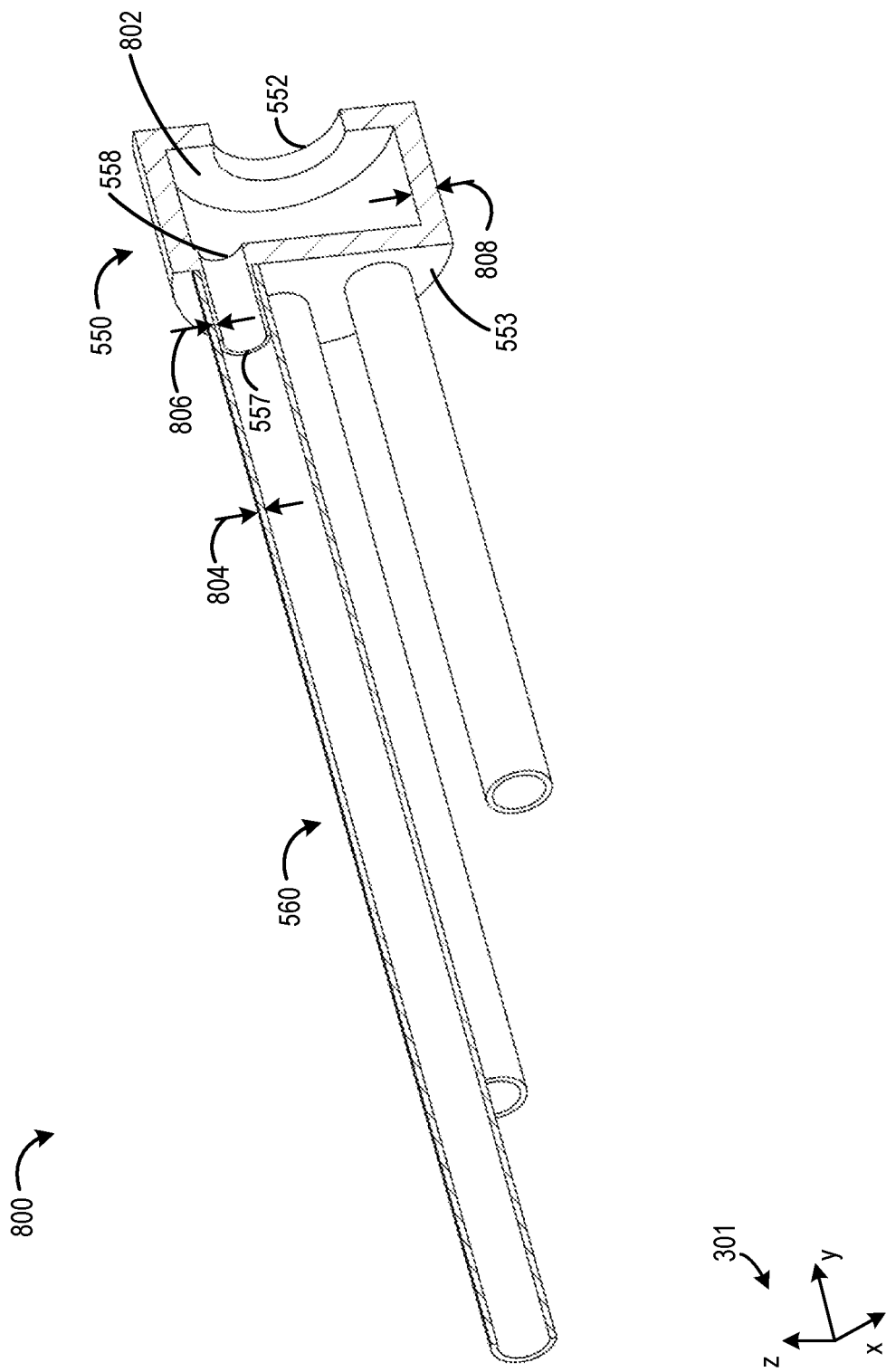
FIG. 8 shows a sectional view of the fluid distribution device.
Figure 9:
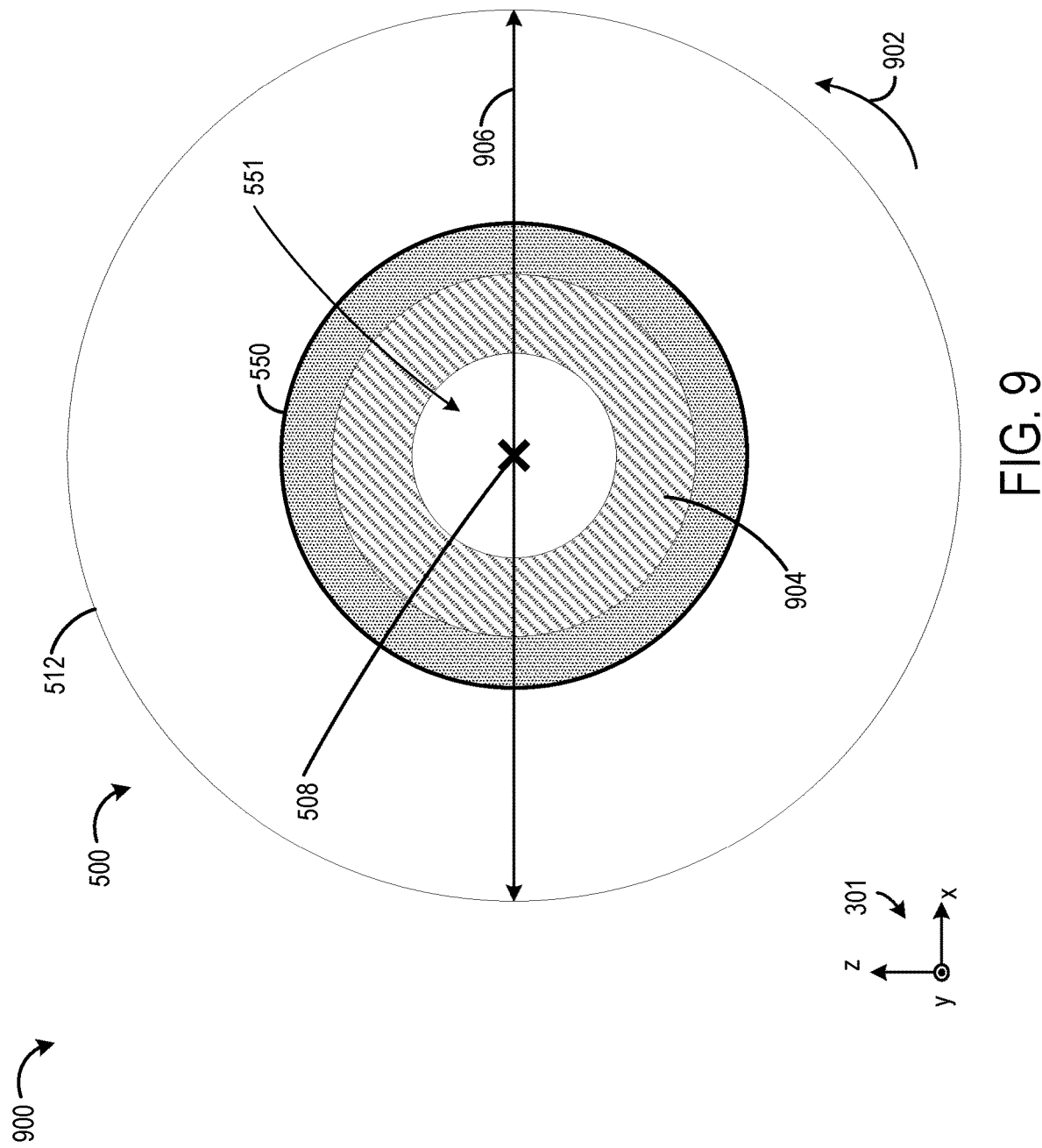
FIG. 9 shows a sectional view of fluid in the cartridge.
Figure 10:
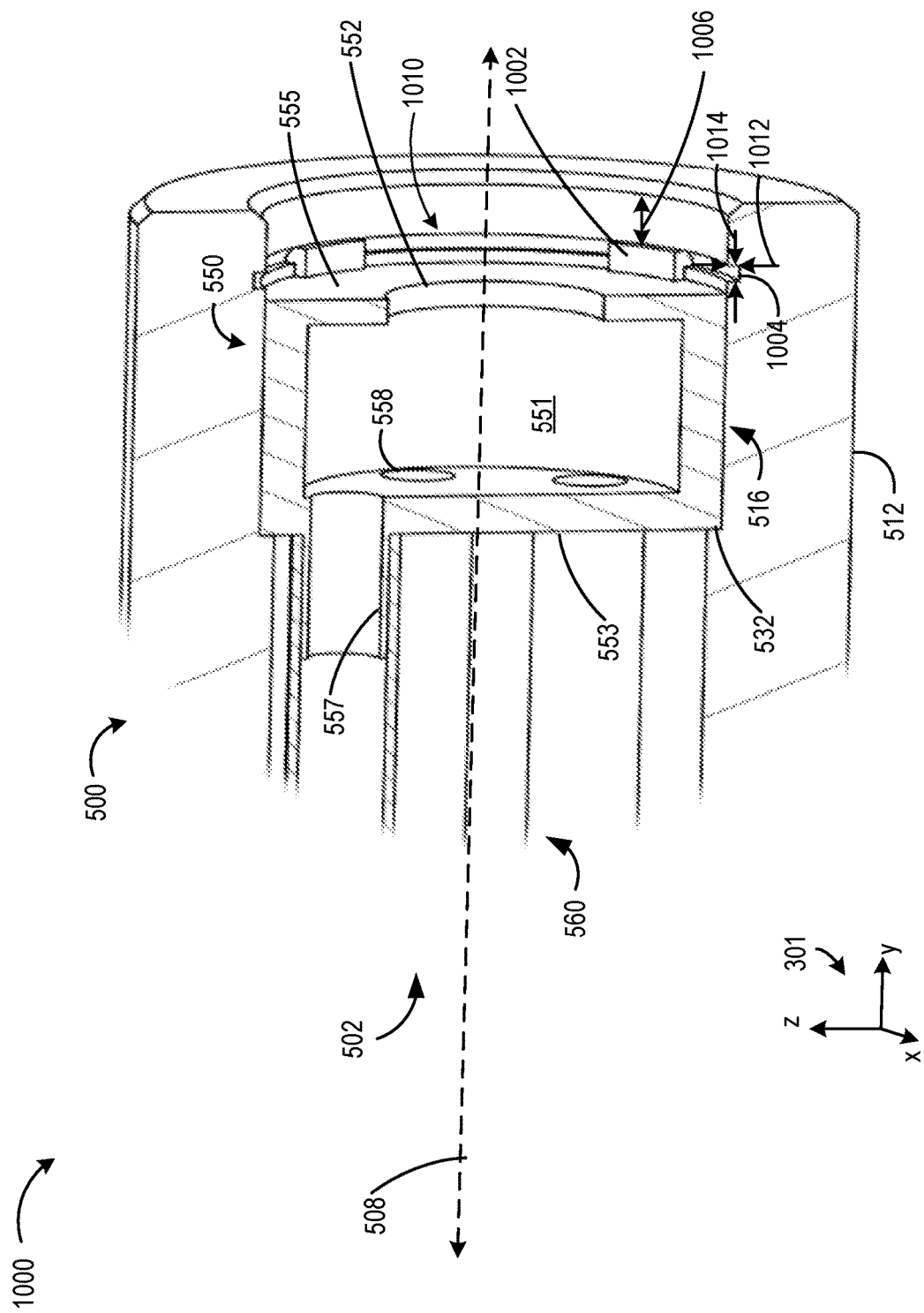
FIG. 10 shows an enlarged view of the fluid distribution device.

Referencing FIG. 9, a sectional view 900 is shown of the fluid distribution system 500. The hollow shaft 512 and the fluid distribution device 502 may rotate about the axis 508 with an angular speed 902 above a threshold angular speed that results in a centrifugal field which collects fluid 904 into an annular volume along the cylindrical circumference defining the hollow interior 551. For example, a controller (e.g., the controller 156 of FIG. 1) communicatively coupled to a mechanical system wherein the fluid distribution system 500 is incorporated may include instructions that when executed cause the fluid distribution system 500 to rotate at least the threshold angular speed about the axis 508. The threshold angular speed may be the angular speed where centrifugal field dominates fluid distribution, thus ensuring the annular fluid volumes. The threshold angular speed may therefore be the square root of twice the ratio of the gravitational acceleration constant to shaft diameter 906. In this way, and with the arrangement of tubes 557 described with reference to FIGS. 7A and 7B, a same hydrostatic head may occur in each pipe (e.g., the pipes 560 of FIGS. 5-8 and 10) of the fluid distribution device 502. Thus, fluid may be allowed to flow into each of the pipes in approximately equal flow rates.

Turning to FIG. 8, a perspective sectional view 800 of the fluid distribution device 502 is shown. An annular wall 802 of the fluid distribution device 502 may serve as similar purpose as the bushing 350 in FIG. 3. For example, the annular wall 802 may facilitate collection of fluid into the annual volume and prevent backflow of the fluid away from the pipes 560 (e.g., towards a positive y-direction). Thus, the fluid distribution device 502 may be said to have an integrated bushing.

Due to the angular speed of the fluid distribution device 502 being at least the threshold angular speed as described with regards to FIG. 9, the pipes 560 and/or the tubes 557 may be subject to bending radially outwards from the axis 508 under bending forces resulting from the centrifugal field. In some examples, such as when bending of the pipes 560 may not be desired, the pipes 560 may be constructed of a rigid material, such as a rigid plastic or metal (e.g., aluminum, steel, or the like). In such an example, the tubes 557 may withstand the bending forces generated by the centrifugal field. In other examples, the pipes 560 may be constructed of a flexible material, such as rubber or the like. In such an examples, the pipes 560 may bear the bending forces rather than the tubes 557. A pipe thickness 804 of the pipes 560 may be greater than a tube thickness 806 of the tubes 557, in at least some examples. However, the pipe thickness 804 and the tube thickness 806 may be chosen according to a desired resistance to bending thereof. For example, if preventing bending is demanded, the pipe thickness 804 and the tube thickness 806 may be increased such that the pipes 560 and tubes 557 may resist bending and remain approximately parallel with the axis 508 while rotating above the threshold angular speed. Further, materials of which the pipes 560 and the tubes 557 are constructed may depend on the desired resistance to bending. In some examples, the tubes 557 and the pipes 560 may be constructed of the same material. In other examples, if bending of the pipes 560 is desired, the pipes 560 may be constructed of a flexible material and the tubes 557 may be constructed of a rigid material.

If the pipes 560 are constructed of a flexible material, the pipes 560 may bend away from the axis 508 such that ends of the pipes 560 adjacent to the pipe outlets 570 may rest against an inner surface of a shaft (e.g., the cylindrical surface defining the passage 516 of FIG. 5) wherein the fluid distribution device 502 is positioned. In this way, pipes 560 which are in face sharing contact with the inner surface may cover one or more channel (e.g., radial channels 520 of FIG. 5) depending on an angular position of the fluid distribution device 502 relative to the shaft. Thus, having a greater number of channels than can be covered by the pipes 560 may be desired to ensure that not all of the channels are blocked, thus preventing reduction in fluid volume reaching any of the consumers. For example, having a greater number of channels (e.g., radial channels 520 of FIG. 5) at a given axial position of the shaft than the number of pipes 560 which extend axially beyond the given axial position may ensure that not all of the channels are clogged when the pipes 560 are bent radially outwards. Additionally or alternatively, rigidity of the pipes 560 being increased such that the pipes 560 do not bend under centrifugal forces may prevent clogging.

As described above, the tubes 557 may be integrally formed with the cylindrical base of the cartridge 550, which may have a base thickness 808. In at least some examples, the base thickness 808 may be greater than the tube thickness 806 and the pipe thickness 804. In other examples, the base thickness 808 may be approximately the same as the tube thickness 806 and/or the pipe thickness 804. The pipes 560 may be secured to the tubes 557 via adhesive in some examples. Additionally or alternatively, the pipes may be secured to the tubes 557 via fitting (e.g., snap fit, press fit, or the like). The pipes 560 may be removably coupled to the tubes 557, such that the pipes 560 may be interchanged to adjust the lengths 564 depending on an application (e.g., depending on axial positions of radial channels in a shaft). In this way, the fluid distribution device 502 may be adaptable to a variety of shafts (e.g., the hollow shaft 512 of FIG. 5) and a variety of mechanical system configurations (e.g., the assembly 302 of FIG. 3 or the assembly 402 of FIG. 4). In other examples, the pipes 560 may be permanently coupled to the corresponding tubes 557. In still other examples, the pipes 560 may be integrally formed with the tubes 557 such that the fluid distribution device 502 is a single continuous unit. The methods of coupling the pipes 560 with the tubes 557 described herein are exemplary and non-limiting.

Further, in at least some examples, the fluid distribution device 502 may be removably coupled to a shaft, such as the hollow shaft 512. For example, turning to FIG. 10, a perspective sectional view 1000 of a portion of the fluid distribution system 500 is shown, including a circlip 1010. The circlip 1010 may include a plurality of fasteners 1002 which may fit with (e.g., via snap fit) a groove 1004 in the hollow shaft 512. The circlip 1010 may axially fix the fluid distribution device 502 with the hollow shaft 512. For example, the groove 1004 may be formed into the hollow shaft 512 along an inner circumference of the hollow shaft 512 adjacent to the inlet 514 of the hollow shaft 512. In such an example, the groove 1004 may be a distance 1006 from a circular opening defining the passage 516. Further, the groove 1004 may have a depth 1012 and a width 1014 according to a shape of the plurality of fasteners 1002, wherein the depth 1012 is a radial dimension and the width 1014 is an axial dimension. The fasteners 1002 may be integrally formed with the cartridge 550 and adapted to be received by the groove 1004. For example, the fasteners 1002 be arranged radially about an end of the cartridge 550 and may extend radially beyond the outer cylindrical surface of the base of the cartridge 550 by a radial distance approximately equal to the depth 1012. Further, the fasteners 1002 may extend axially beyond the first circular side 555 by an axial distance approximately equal to the width 1014. Thus, the fasteners 1002 may fit into the groove 1004 such that the fluid distribution device 502 is secured to the hollow shaft 512. In this way, the fluid distribution device 502 may be fixed (e.g., axially and rotationally) to the hollow shaft 512 via snap fit between the fasteners 1002 and the groove 1004. The fluid distribution device 502 may additionally be axially fixed within the hollow shaft 512 by the shoulder 532 formed at the second circular side 553. In some examples, the fluid distribution device 502 may be removable from the hollow shaft 512. For example, the circlip 1010 may allow the fluid distribution device 502 to be secured to and unsecured from the hollow shaft 512 as desired. Removing the fluid distribution device 502 may be desired for maintenance, for example to adjust lengths or numbers of the pipes 560. In another example, the fluid distribution device 502 may be transferrable to a different shaft in the same or another mechanical system. In other examples, the fluid distribution device 502 may be permanently coupled to the hollow shaft 512.

Further, in other examples, a fluid distribution device 502 may be secured to a hollow shaft 512 by other methods, additionally or alternatively to the circlip 1010. For example, the fluid distribution device 502 may be secured to the hollow shaft 512 via adhesive. In some examples, the fluid distribution device 502 may be integrally formed as a single continuous unit with the hollow shaft 512 such that there is no clearance between the cartridge 550 and the inner cylindrical wall defining the passage 516. Further still, other methods and/or combinations of methods of securing a fluid distribution device (e.g., the fluid distribution device 502) to a shaft (e.g., the hollow shaft 512) may be implemented without departing from the scope of the present disclosure.

A fluid distribution device may also be adapted to be positioned within a different hollow shaft, such as the shaft 412 of FIG. 4, the first shaft 312 or the second shaft 314 of FIG. 3. Dimensions of the fluid distribution device may depend on dimensions of the hollow shaft. For example, lengths of the pipes 560 may be lengthened or shortened according to axial positions of channels of the hollow shaft, and the cartridge diameter 556 may be increased or decreased depending on a passage diameter of the hollow shaft for a proper clearance as described above.

Further, in some examples, there may be more than one shaft, such as the hollow shaft 512, through which fluid is delivered to consumers in a mechanical system (e.g., a transmission of a vehicle). In such an example, there may be one or more fluid distribution devices, such as the fluid distribution device 502, each positioned within and coaxial with a corresponding hollow shaft. For example, there may be two or more fluid distribution devices. Each of the one or more fluid distribution devices may have similar geometry (e.g., numbers of tubes and pipes, lengths of pipes, etc.), for example if radial channels such as the radial channels 520 are axially positioned similarly in each corresponding shaft. The fluid distribution devices may each have an approximately identical cartridge (e.g., same size, number of tubes, etc.) in some examples. In this way, resource demand may be reduced as fewer dissimilar parts may be manufactured. In other examples, cartridges may be different in shape and/or size. For example, a greater number of tubes may be demanded to accommodate a greater number of consumers arranged about a corresponding hollow shaft. Additionally or alternatively, a greater thickness of tubes may be demanded to withstand greater centrifugal force at higher angular speed. Additionally or alternatively, each of the one or more fluid distribution devices may have different geometry based on the axial positioning of the radial channels of each shaft. For example, if a first hollow shaft has five axial positions at which radial channels are arranged, a first corresponding fluid distribution device may have five pipes with appropriate lengths as described above. If a second hollow shaft in the same mechanical system has four axial positions at which radial channels are arranged, a second corresponding fluid distribution device may have four pipes with appropriate lengths to reach within the threshold axial distance of the axial positions as described above. Thus, the numbers and/or lengths of pipes of each fluid distribution device may depend on the axial positions of the radial channels along the corresponding hollow shaft. The first corresponding fluid distribution device and the second corresponding fluid distribution device may both have approximately the same cartridge shape including five or more tubes.

The technical effect of the fluid distribution system disclosed herein is to deliver fluid to two or more moving consumers in a mechanical system in approximately equal amounts. For example, the fluid distribution system may be incorporated into a transmission, such as a multi-speed gearbox, to deliver lubrication fluid to gears and or bearings in the system. By distributing fluid more evenly to each of the consumers, an adequate volume of fluid may be delivered to each consumer without introducing excessive fluid to the mechanical system, thus reducing fluid volume demands. Further, efficiency of the mechanical system may be increased due to the reduced fluid volume demands. For example, with the fluid distribution system in a transmission, less fluid may accumulate in a sump (e.g., sump 228 of FIG. 2) of the transmission, thereby reducing drag losses of gears exposed to the excess fluid buildup. In summary, fluid distribution in a mechanical system using the fluid distribution system disclosed herein may reduce resource demand and increase efficiency of the mechanical system wherein the fluid distribution system is employed.

The disclosure also provides support for a fluid distribution system, comprising: a fluid distribution device positioned in a hollow shaft comprising a coaxial passage and a plurality of radial channels, the fluid distribution device comprising: a cartridge coaxial with the hollow shaft, comprising a first circular side having a coaxial inlet opening and a second circular side having a plurality of tube openings positioned equidistantly from an axis of rotation of the hollow shaft, and a plurality of pipes, each pipe extending from one of the plurality of tube openings parallel to the axis of rotation of the hollow shaft, where a length of each pipe corresponds to axial positions of the plurality of radial channels axially spread apart along the hollow shaft. In a first example of the system, the axis of rotation is horizontal with respect to a direction of gravity. In a second example of the system, optionally including the first example, a first number of the radial channels located at an axial position along the hollow shaft is greater than a second number of pipes that extend beyond the axial position. In a third example of the system, optionally including one or both of the first and second examples, pipe outlets of the plurality of pipes are within a threshold non-zero axial distance from at least one of the plurality of radial channels. In a fourth example of the system, optionally including one or more or each of the first through third examples, a passage diameter of the coaxial passage is 30 mm and an inlet diameter of the coaxial inlet opening is 15 mm. In a fifth example of the system, optionally including one or more or each of the first through fourth examples, a clearance between the fluid distribution device and the hollow shaft is between 0.1 mm and 0.2 mm. In a sixth example of the system, optionally including one or more or each of the first through fifth examples, the fluid distribution device is axially fixed to the hollow shaft by a circlip. In a seventh example of the system, optionally including one or more or each of the first through sixth examples, the cartridge is adapted to collect fluid in an annular volume. In an eighth example of the system, optionally including one or more or each of the first through seventh examples, the plurality of pipes are centered about pipe axes parallel to the axis of rotation, the pipe axes spaced by a radial distance from the axis of rotation. In a ninth example of the system, optionally including one or more or each of the first through eighth examples, a diameter of the coaxial inlet opening is less than a minimum diameter of a circle enveloping the tube openings. In a tenth example of the system, optionally including one or more or each of the first through ninth examples, the fluid distribution device is adapted to distribute approximately equal amounts of fluid through each of the plurality of pipes.

The disclosure also provides support for a transmission system, comprising: a hollow shaft comprising a coaxial passage and two or more radial channels, two or more consumers arranged about the hollow shaft, a pump adapted to transfer fluid into an inlet of the hollow shaft, and a fluid distribution device is positioned within and coaxial with the hollow shaft, wherein the fluid distribution device comprises: a cartridge comprising a cylindrical base and a plurality of tubes, wherein the plurality of tubes are axially oriented and radially arranged about an axis of rotation of the fluid distribution device and the hollow shaft, and a plurality of pipes, each pipe fixed to and circumferentially surrounding one of the plurality of tubes, wherein lengths of the plurality of pipes correspond to axial positions of the two or more radial channels along the hollow shaft. In a first example of the system, the two or more radial channels fluidly connect the coaxial passage and the two or more consumers, and wherein the fluid distribution device fluidly connects the inlet to the coaxial passage. In a second example of the system, optionally including the first example, the transmission system includes two or more fluid distribution devices, wherein each fluid distribution device is positioned within and coaxial with a corresponding hollow shaft, and wherein numbers and/or lengths of the plurality of pipes correspond to axial positions of the two or more radial channels of the corresponding hollow shaft. In a third example of the system, optionally including one or both of the first and second examples, the plurality of pipes bend and rest on a cylindrical surface defining the coaxial passage of the hollow shaft. In a fourth example of the system, optionally including one or more or each of the first through third examples, pipe outlets of the plurality of pipes are within a threshold non-zero axial distance from at least one of the two or more radial channels, and wherein a first number of the two or more radial channels located at an axial position along the hollow shaft is one more than a second number of the plurality of pipes that extend beyond the axial position. In a fifth example of the system, optionally including one or more or each of the first through fourth examples, the two or more radial channels at a given axial distance are angularly spaced equidistantly from each other.

The disclosure also provides support for a vehicle, comprising: a transmission comprising, a forced lubrication system including a fluid distribution device positioned within a hollow shaft and adapted to deliver approximately equal amounts of fluid to two or more consumers arranged about the hollow shaft, wherein the hollow shaft and the fluid distribution device are coaxial, and a controller, including instructions stored on non-transitory memory that when executed cause the transmission to: rotate the hollow shaft and the fluid distribution device about an axis of rotation at least a threshold angular speed. In a first example of the system, the threshold angular speed is an angular speed at which fluid collects in an annular volume within the fluid distribution device. In a second example of the system, optionally including the first example, the fluid distribution device comprises a plurality of pipe outlets equidistantly spaced from the axis of rotation and each of the plurality of pipe outlets is within a threshold non-zero axial distance from one or more radial channels axially spaced along the hollow shaft.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fluid distribution system, comprising:
a fluid distribution device positioned in a hollow shaft comprising a coaxial passage and a plurality of radial channels, the fluid distribution device comprising:
a cartridge coaxial with the hollow shaft, comprising a first circular side having a coaxial inlet opening and a second circular side having a plurality of tube openings positioned equidistantly from an axis of rotation of the hollow shaft; and
a plurality of pipes, each pipe extending from one of the plurality of tube openings parallel to the axis of rotation of the hollow shaft, where a length of each pipe corresponds to axial positions of the plurality of radial channels axially spread apart along the hollow shaft.

2. The fluid distribution system of claim 1, wherein the axis of rotation is horizontal with respect to a direction of gravity.

3. The fluid distribution system of claim 1, wherein a first number of the radial channels located at an axial position along the hollow shaft is greater than a second number of pipes that extend beyond the axial position.

4. The fluid distribution system of claim 1, wherein pipe outlets of the plurality of pipes are within a threshold non-zero axial distance from at least one of the plurality of radial channels.

5. The fluid distribution system of claim 1, wherein a passage diameter of the coaxial passage is 30 mm and an inlet diameter of the coaxial inlet opening is 15 mm.

6. The fluid distribution system of claim 1, wherein a clearance between the fluid distribution device and the hollow shaft is between 0.1 mm and 0.2 mm.

7. The fluid distribution system of claim 1, wherein the fluid distribution device is axially fixed to the hollow shaft by a circlip.

8. The fluid distribution system of claim 1, wherein the cartridge is adapted to collect fluid in an annular volume.

9. The fluid distribution system of claim 1, wherein the plurality of pipes are centered about pipe axes parallel to the axis of rotation, the pipe axes spaced by a radial distance from the axis of rotation.

10. The fluid distribution system of claim 9, wherein a diameter of the coaxial inlet opening is less than a minimum diameter of a circle enveloping the tube openings.

11. The fluid distribution system of claim 1, wherein the fluid distribution device is adapted to distribute approximately equal amounts of fluid through each of the plurality of pipes.

12. A transmission system, comprising:
a hollow shaft comprising a coaxial passage and two or more radial channels;
two or more consumers arranged about the hollow shaft;
a pump adapted to transfer fluid into an inlet of the hollow shaft; and
a fluid distribution device positioned within and coaxial with the hollow shaft, wherein the fluid distribution device comprises:
a cartridge comprising a cylindrical base and a plurality of tubes, wherein the plurality of tubes are axially oriented and radially arranged about an axis of rotation of the fluid distribution device and the hollow shaft; and
a plurality of pipes, each pipe fixed to and circumferentially surrounding one of the plurality of tubes, wherein lengths of the plurality of pipes correspond to axial positions of the two or more radial channels axially spread apart along the hollow shaft.

13. The transmission system of claim 12, wherein the two or more radial channels fluidly connect the coaxial passage and the two or more consumers, and wherein the fluid distribution device fluidly connects the inlet to the coaxial passage.

14. The transmission system of claim 12, wherein the transmission system includes two or more fluid distribution devices, wherein each fluid distribution device is positioned within and coaxial with a corresponding hollow shaft, and wherein numbers and/or lengths of the plurality of pipes correspond to axial positions of the two or more radial channels of the corresponding hollow shaft.

15. The transmission system of claim 12, wherein the plurality of pipes bend and rest on a cylindrical surface defining the coaxial passage of the hollow shaft.

16. The transmission system of claim 12, wherein pipe outlets of the plurality of pipes are within a threshold non-zero axial distance from at least one of the two or more radial channels, and wherein a first number of the two or more radial channels located at an axial position along the hollow shaft is one more than a second number of the plurality of pipes that extend beyond the axial position.

17. The transmission system of claim 12, wherein the two or more radial channels at a given axial distance are angularly spaced equidistantly from each other.

* * * * *